(12) United States Patent
Lin

(10) Patent No.: US 10,795,848 B2
(45) Date of Patent: Oct. 6, 2020

(54) DUAL WAY COMMUNICATION METHOD, SYSTEM, AND MASTER DEVICE THEREOF

(71) Applicant: WIWYNN CORPORATION, New Taipei (TW)

(72) Inventor: Chieh-Yi Lin, New Taipei (TW)

(73) Assignee: WIWYNN CORPORATION, New Taipei (TW)

( * ) Notice: Subject to any disclaimer, the term of this patent is extended or adjusted under 35 U.S.C. 154(b) by 0 days.

(21) Appl. No.: 15/990,379

(22) Filed: May 25, 2018

(65) Prior Publication Data

US 2019/0286599 A1  Sep. 19, 2019

(30) Foreign Application Priority Data

Mar. 13, 2018 (TW) .................................. 107108373

(51) Int. Cl.
*G06F 13/40* (2006.01)
*G06F 13/362* (2006.01)

(52) U.S. Cl.
CPC ........ *G06F 13/4068* (2013.01); *G06F 13/362* (2013.01)

(58) Field of Classification Search
None
See application file for complete search history.

(56) References Cited

U.S. PATENT DOCUMENTS

| | | | | |
|---|---|---|---|---|
| 6,815,992 B1 * | 11/2004 | Ng | .................... | G01R 31/3004 327/199 |
| 7,305,494 B2 * | 12/2007 | Lee | ..................... | G06F 3/0227 709/230 |
| 2002/0067284 A1 * | 6/2002 | Chamberlain | .......... | H04L 43/06 340/870.02 |
| 2004/0260841 A1 * | 12/2004 | Mathew | .............. | H04L 41/0206 709/250 |
| 2005/0111151 A1 * | 5/2005 | Lam | ........................ | H04M 3/18 361/86 |

(Continued)

FOREIGN PATENT DOCUMENTS

| CN | 101894088 A | 11/2010 |
|---|---|---|
| CN | 106250336 A | 12/2016 |

OTHER PUBLICATIONS

Taiwanese Office Action issued in corresponding application No. 107108373, dated Jan. 29, 2019 (partial translation).

(Continued)

*Primary Examiner* — Elias Mamo
(74) *Attorney, Agent, or Firm* — Maschoff Brennan

(57) ABSTRACT

A dual way communication method adapted for a multipoint transmission structure is presented. A dual way communication channel is turned on for a transmission demanding terminal corresponding to a notice signal when the notice signal from the transmission demanding terminal is detected. Via the dual way communication channel, a dual way demanding message corresponding to the transmission demanding terminal is received, or another dual way demanding message corresponding to the transmission demanding terminal is sent out. The above method can be applied to a system constructed by the multipoint transmission structure or to a master device of the multipoint transmission structure.

21 Claims, 17 Drawing Sheets

(56) References Cited

U.S. PATENT DOCUMENTS

| | | | |
|---|---|---|---|
| 2006/0020726 A1* | 1/2006 | Fujii | G06F 13/385 |
| | | | 710/100 |
| 2007/0101029 A1 | 5/2007 | Lee | |
| 2013/0315398 A1* | 11/2013 | Chiu | H04R 5/04 |
| | | | 381/17 |

OTHER PUBLICATIONS

CN Office Action in Application No. 201810330728.9 dated Jun. 1, 2020.

* cited by examiner

DUAL WAY COMMUNICATION METHOD, SYSTEM, AND MASTER DEVICE THEREOF

CROSS-REFERENCE TO RELATED APPLICATIONS

This non-provisional application claims priority under 35 U.S.C. § 119(a) on Patent Application No(s). 107108373 filed in Taiwan, R.O.C. on Mar. 13, 2018, the entire contents of which are hereby incorporated by reference.

TECHNICAL FIELD

The disclosure relates to a transmission method, system and master device, more particularly to a dual way communication method, system and master device.

BACKGROUND

In existing multipoint transmission structures, respective nodes usually communicate with their master ends through the intelligent platform management bus (IPMB) protocol. The IPMB protocol is a subclass of the inter-integrated circuit (I2C) bus protocol. In the IPMB protocol, a respective transmission task is assigned with only one slave address. Since all nodes share a common slave address, each of these nodes requires an exclusive I2C bus connection to the master end for information transmission. The more the number of nodes is, the master end needs more I2C buses connecting to the nodes.

Please refer to FIG. 1. FIG. 1 is a system block diagram of a conventional multipoint transmission system. Each of the nodes 120_1~120_4 transmits information based on the intelligent platform management bus (IPMB) protocol, and the nodes 120_1~120_4 are respectively connected to a master end 100 through I2C buses 110_1~110_4. It can be appreciated that the master end 100 also needs to connect to the I2C buses 110_1~110_4 for the information transmission with the nodes 120_1~120_4. However, the number of I2C buses which the master end 100 can connect to is finite (e.g. 14 I2C buses) so that the number of nodes which the master end 100 can connect to is also limited. Therefore, it is difficult to freely increase the number of nodes the master end can connect to.

SUMMARY

According to various embodiments of the present disclosure, a dual way communication method is adapted for a multipoint transmission structure and is applied to a controller. The dual way communication method includes: detecting whether a transmission demanding terminal triggers a notice signal; enabling, via a transmission channel, a dual way communication channel for connecting to the transmission demanding terminal corresponding to the notice signal when the notice signal is detected; and receiving or transmitting a dual way demanding message corresponding to the transmission demanding terminal through the dual way communication channel.

In the dual way communication method according to one of the embodiments of the present disclosure, enabling, via the transmission channel, the dual way communication channel for connecting the transmission demanding terminal corresponding to the notice signal includes: controlling a multiplexer via the transmission channel to enable the dual way communication channel for connecting to the transmission demanding terminal corresponding to the notice signal.

In the dual way communication method according to one of the embodiments of the present disclosure, detecting whether the transmission demanding terminal triggers the notice signal includes: triggering the notice signal when the dual way demanding message is detected in the transmission demanding terminal.

In the dual way communication method according to one of the embodiments of the present disclosure, the dual way communication method further includes: triggering a high priority notice signal or a low priority notice signal according to a priority of the dual way demanding message via the transmission demanding terminal. The dual way demanding message corresponding to the high priority notice signal is first received or transmitted.

In the dual way communication method according to one of the embodiments of the present disclosure, the dual way communication method further includes: enabling the dual way communication channel to be connected to the transmission demanding terminal corresponding to the dual way demanding message via the transmission channel when the dual way demanding message is detected; and transmitting or receiving the dual way demanding message through the dual way communication channel.

In the dual way communication method according to one of the embodiments of the present disclosure, the dual way communication method further includes: first enabling the dual way communication channel via the transmission channel to connect to the transmission demanding terminal corresponding to the high priority dual way demanding message when detecting existence of a high priority dual way demanding message; and transmitting or receiving the high priority dual way demanding message via the dual way communication channel.

In the dual way communication method according to one of the embodiments of the present disclosure, transmitting or receiving the dual way demanding message corresponding to the transmission demanding terminal through the dual way communication channel comprises: transmitting or receiving the dual way demanding message through a baseboard management controller and the dual way communication channel by the transmission demanding terminal. The dual way demanding message is a demanding message, a response message, a high priority demanding message, a low priority demanding message, a high priority response message or a low priority response message which conforms to an IPMB protocol.

In the dual way communication method according to one of the embodiments of the present disclosure, detecting whether the transmission demanding terminal triggers the notice signal includes: reading a status signal through an expander; and recognizing the notice signal, triggered by the transmission demanding terminal, according to the status signal.

In the dual way communication method according to one of the embodiments of the present disclosure, reading the status signal through the expander includes: controlling a multiplexer via the transmission channel to enable an expanded channel corresponding to the expander; and reading the status signal through the expanded channel.

In the dual way communication method according to one of the embodiments of the present disclosure, the dual way communication method further includes: via the transmission demanding terminal, stopping triggering the notice signal when transmission of the dual way demanding message is finished; and disabling the dual way communication channel corresponding to the notice signal via the transmission channel.

In the dual way communication method according to one of the embodiments of the present disclosure, the dual way communication method further includes: controlling a multiplexer via the transmission channel to disable the dual way communication channel and enable an expanded channel corresponding to an expander when the notice signal is not detected.

According to various embodiments of the present disclosure, a dual way communication system includes: a master device, a transmission channel and dual way communication channels. The master device includes a controller and a transmission port. The transmission port is coupled to the controller. The transmission channel is connected to the transmission port of the master device. The dual way communication channels are respectively connected to transmission demanding terminals. The transmission channel is able to be selectively connected to one of the dual way communication channels. The controller, via the transmission port, detects whether one of the transmission demanding terminals triggers a notice signal. When the controller detects the notice signal, the controller, via the transmission channel, enables one of the dual way communication channels for connecting to the transmission demanding terminal, which corresponds to the notice signal, among the transmission demanding terminals. The controller receives or transmits a dual way demanding message from the transmission demanding terminal corresponding to the notice signal through the enabled dual way communication channel.

In the dual way communication system according to one of the embodiments of the present disclosure, the transmission channel is connected to a multiplexer, the controller controls the multiplexer via the transmission channel to enable one of the dual way communication channels for connecting to the transmission demanding terminal corresponding to the notice signal.

In the dual way communication system according to one of the embodiments of the present disclosure, one of the transmission demanding terminals is connected to the transmission port through a high priority notice channel and a low priority notice channel. According to a priority of the dual way demanding message, said transmission demanding terminal triggers a high priority notice signal and transmits the high priority notice signal to the controller through the high priority notice channel, or said transmission demanding terminal triggers a low priority notice signal and transmits the low priority notice signal to the controller through the low priority notice channel.

In the dual way communication system according to one of the embodiments of the present disclosure, the controller is a baseboard management controller, and the dual way demanding message is a demanding message, a response message, a high priority demanding message, a low priority demanding message, a high priority response message or a low priority response message which conforms to an IPMB protocol.

In the dual way communication system according to one of the embodiments of the present disclosure, the controller is connected to an expander through the transmission channel. The controller reads a status signal through the expander. The controller, according to the status signal, recognizes the notice signal triggered by one of the transmission demanding terminals.

In the dual way communication system according to one of the embodiments of the present disclosure, the transmission channel is connected to a multiplexer, and the expander is connected to the multiplexer. The controller controls the multiplexer via the transmission channel to enable an expanded channel corresponding to the expander. The controller reads the status signal through the expanded channel.

In the dual way communication system according to one of the embodiments of the present disclosure, the transmission channel is connected to a multiplexer, and the multiplexer is connected to an expander. The controller controls the multiplexer via the transmission channel to disable the enabled dual way communication channel and enable an expanded channel corresponding to the expander when the controller does not detect the notice signal.

According to various embodiments of the present disclosure, a dual way communication master device is adapted for a multipoint transmission structure and includes: a controller, a transmission port and a transmission channel. The transmission port is coupled to the controller, and the transmission channel is connected to the transmission port. The controller is configured to enable a dual way communication channel corresponding to a notice signal through the transmission channel and then transmit or receive a dual way demanding message corresponding to the notice signal through the dual way communication channel when detecting, via the transmission port, the notice signal.

In the dual way communication master device according to one of the embodiments of the present disclosure, when the controller detects that the master device has the dual way demanding message, the controller enables the dual way communication channel corresponding to the dual way demanding message through the transmission channel, and then the controller transmits or receives the dual way demanding message through the dual way communication channel.

In the dual way communication master device according to one of the embodiments of the present disclosure, when the controller detects that the master device has a high priority dual way demanding message, the controller first enables the dual way communication channel corresponding to the high priority dual way demanding message through the transmission channel, and then the controller transmits or receives the high priority dual way demanding message through the dual way communication channel.

In the dual way communication master device according to one of the embodiments of the present disclosure, when the controller, via the transmission port, detects a high priority notice signal, the controller first enables the dual way communication channel corresponding to the high priority notice signal via the transmission channel, and the controller transmits or receives the dual way demanding message corresponding to the high priority notice signal through the dual way communication channel.

In the dual way communication master device according to one of the embodiments of the present disclosure, the controller is a baseboard management controller, and the dual way demanding message is a demanding message, a response message, a high priority demanding message, a low priority demanding message, a high priority response message or a low priority response message which conforms to an IPMB protocol.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
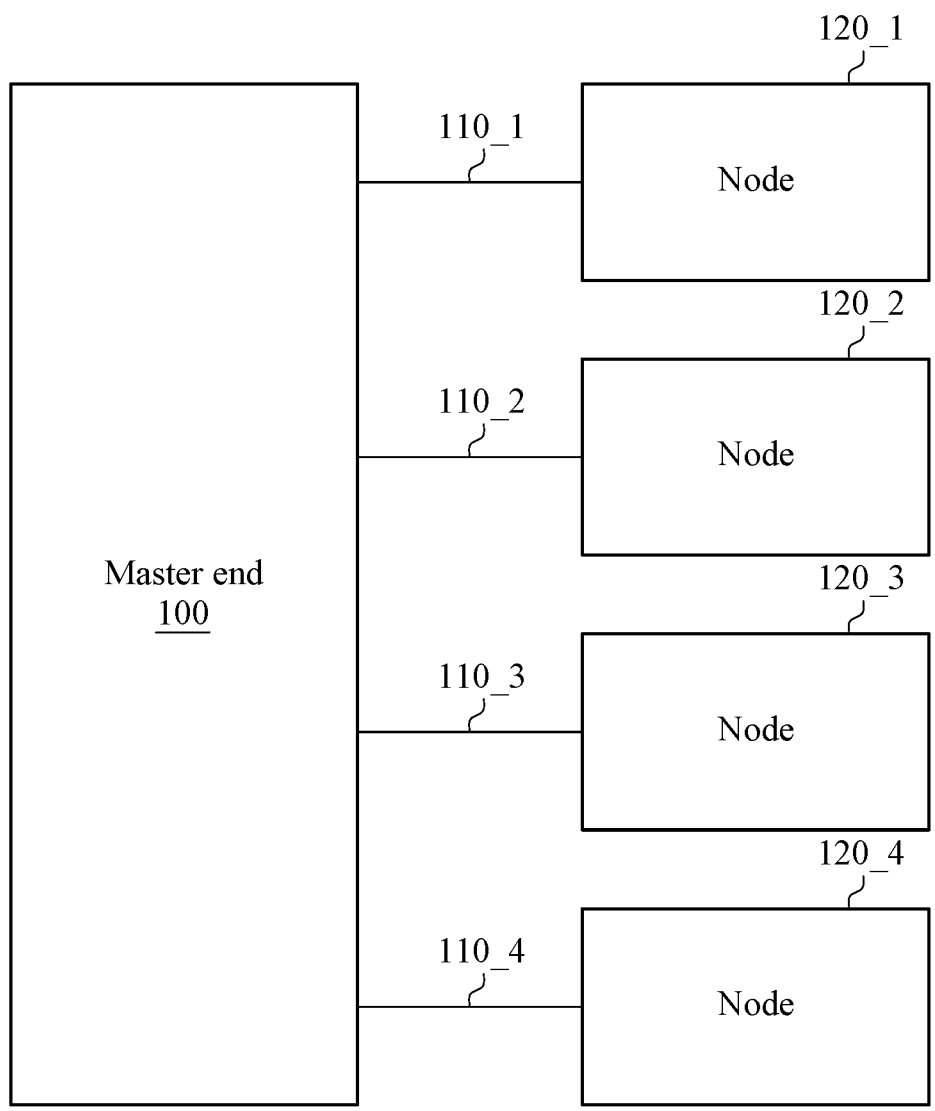
FIG. 1 is a system block diagram of a multipoint transmission system in the related art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the following description, the term "connect" means electrical connection in the general sense. Specifically, when one element is described to be electrically connected to another element, the two elements are directly connected or have one another element therebetween for the transmission of electrical signals.

Figure 2:
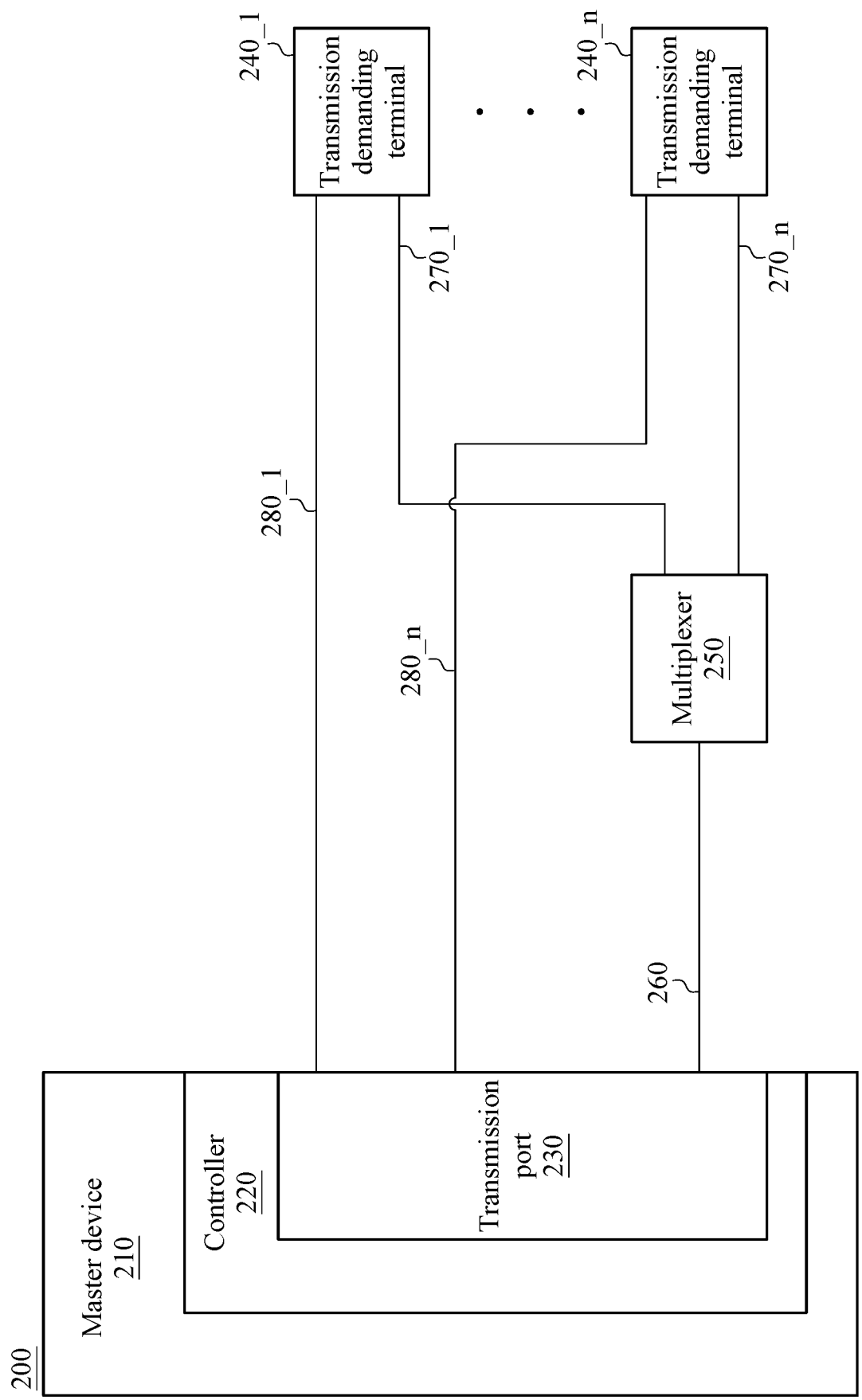
FIG. 2 is a system block diagram of a dual way communication system according to an embodiment of the present disclosure.

FIG. 2 is a system block diagram of a dual way communication system according to an embodiment of the present disclosure. Please refer to FIG. 2, the dual way communication system 200 is adapted for a multipoint transmission structure, and the dual way communication system 200 includes a master device 210 and transmission demanding terminals 240 (as shown in FIG. 2, the number of transmission demanding terminals 240 is totally n in this embodiment, they are transmission demanding terminals 240_1~240_n, and these transmission demanding terminals 240 are connected to the master device 210).

The master device 210 includes a controller 220, such as a server or a workstation. For example, the server is a workgroup server, a department server or an enterprise server, and has the ability of communication with multiple node devices or has the ability of transmitting/receiving information to/from multiple node devices. For instance, the controller 220 is a baseboard management controller (BMC), and the controller 220 includes a transmission port 230. The master device 210 is respectively connected to the transmission demanding terminals 240 via the transmission port 230. For example, the transmission port 230 is an I2C bus port, a general-purpose input/output (GPIO) port, other port or any combination thereof. The present disclosure is not limited to the above examples. Each of the transmission demanding terminals 240 is a node connected to the master device 210, and can communicate with the master device 210 or can transmit information to and receive information from the master device 210. For example, each of the transmission demanding terminals 240 is a server, a workgroup server, a department server or an enterprise server.

The above transmission demanding terminals 240 are connected to the master device 210 through multiple notifying channels 280 (as shown in FIG. 2, the number of notifying channels 280 corresponds to the number of transmission demanding terminals 240 and is totally n in this embodiment, namely notifying channels 280_1~280_n). The transmission demanding terminals 240 are further connected to multiple dual way communication channels 270 (similarly, the number of dual way communication channels 270 corresponds to the number of transmission demanding terminals 240 and is totally n, namely dual way communication channels 270_1~270_n). Specifically, the transmission demanding terminals 240_1~240_n are respectively connected to the transmission port 230 of the master device 210 through the notifying channels 280_1~280_n, and the transmission demanding terminals 240_1~240_n are further connected to the dual way communication channels 270_1~270_n respectively. Moreover, the transmission port 230 of the master device 210 is further connected to a transmission channel 260. The transmission channel 260 is selectively connected to a respective dual way communication channel 270. In this embodiment, the opposite ends of a multiplexer 250 are respectively connected to the transmission channel 260 and the dual way communication channels 270 so that the selective connection between the transmission channel 260 and the dual way communication channels 270 described above can be achieved. The controller 220 of the master device 210 can detect, via the transmission port 230 and the notifying channels 280, whether the transmission demanding terminal 240 triggers a notice signal. When the master device 210 detects the notice signal, the master device 210 enables one of the dual way communication channels 270 through the transmission channel 260, so as to connect the transmission demanding terminal 240 corresponding to the notice signal to the transmission port 230.

In another embodiment, arranging the respective connections of the multiple transmission channels 260 to multiple multiplexers 250 allows the number of dual way communication channels 270 for connection to be increased, so that the master device can be connected to more transmission demanding terminals 240. Optionally, in another embodiment, the multiplexer 250 can be a multiplexer device having a multi-level tree structure so that this multiplexer device having a multi-level tree structure allows more dual way communication channels 270 to be connected. Therefore, the disposition and configuration of the transmission channels 260 and the multiplexer 250, the number of transmission channels 260 and the number of multiplexers 250 can be modified according to various requirements.

Figure 3:
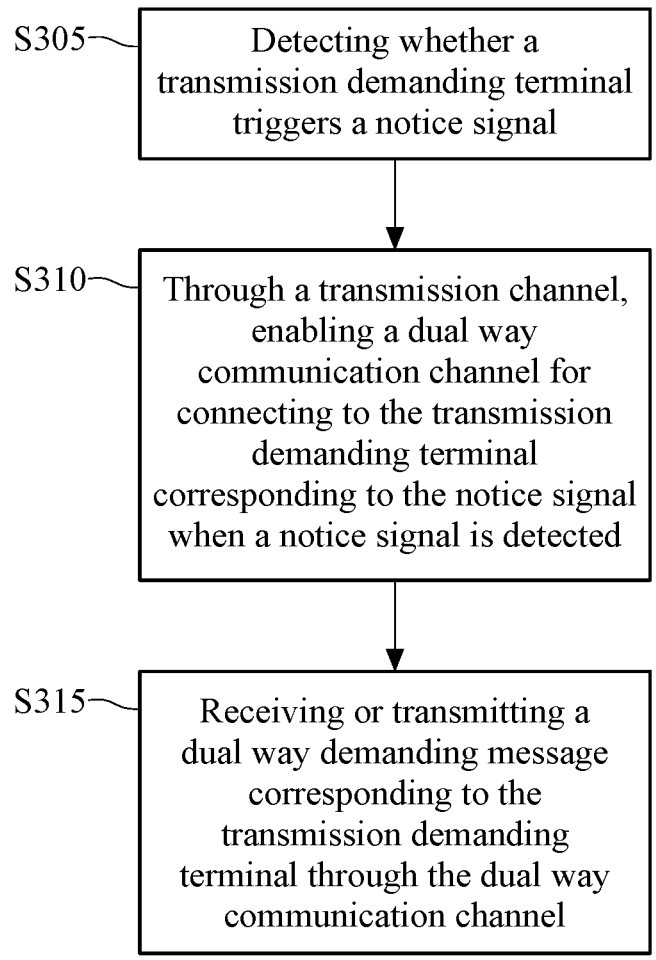
FIG. 3 is a flow chart of a dual way communication method according to an embodiment of the present disclosure.

Please refer to FIG. 2 and FIG. 3 together. FIG. 3 is a flow chart illustrating a dual way communication method according to an embodiment of the present disclosure. Steps S305~S315 are adapted for a multipoint transmission structure, and is applied to the controller 220 of the master device 210. Particularly, in step S305, the controller 220 detects whether the transmission demanding terminal 240 triggers a notice signal. For example, the controller 220, via a general purpose input/output (GPIO) connecting port in the transmission port 230, detects a notice signal triggered by one of the transmission demanding terminals 240_1~240_n. Therefore, when the transmission demanding terminal 240 detects that a dual way demanding message exists (that is, the transmission demanding terminal 240 needs to have a connection to the master device 210 for the transmission of the dual way demanding message), the transmission demanding terminal 240 triggers a notice signal (e.g. a high potential signal or a low potential signal) and sends the notice signal to the transmission port 230 through the notifying channel 280, and then the controller 220 can, via the transmission port 230, detects the notice signal triggered by one of the transmission demanding terminals 240_1~240_n.

Next, in step S310, when the controller 220 detects the notice signal, the controller 220 enables the dual way communication channel 270 via the transmission channel 260, so as to connect to the transmission demanding terminal 240 corresponding to the notice signal. Specifically, the master device 210 further includes a storage unit (not shown in the figures). The storage unit is, for example, a nonvolatile memory, a random access memory, a hard disk device or the like. The storage unit pre-stores information about notice signals and the transmission demanding terminals 240 (e.g. a table of correlation between notice signals and the transmission demanding terminals 240, or a table of correlation of the dual way communication channels 270 each connecting a respective GPIO port to a respective transmission demanding terminal 240) therein, and thus, the controller 220 can look up a table and then enable a dual way communication channel 270 through a transmission channel 260 to connect to a transmission demanding terminal 240 corresponding to a notice signal when detecting existence of the notice signal. In another embodiment, the controller 220 controls the multiplexer 250 through a transmission channel 260 to enable a dual way communication channel 270 for connecting to a transmission demanding terminal 240 corresponding to a notice signal. For example, the storage unit can further store control signals respectively corresponding to notice signals so that the controller 220 can control the multiplexer 250 with a control signal through a transmission channel 260 and the multiplexer 250 is controlled according to the control signal to enable a dual way communication channel 270 corresponding to a notice signal; and accordingly, the master device 210 can connect to a transmission demanding terminal 240 corresponding to the notice signal. In the embodiment described above, the transmission channel 260 is, for example, an I2C bus connected to the I2C bus port of the transmission port 230, and the dual way communication channel 270 is, for example, an I2C bus. The structure and operation described above cause a connection between the transmission channel 260 and the dual way communication channel 270 and an electrical connection between the master device 210 and the transmission demanding terminal 240 corresponding to the notice signal when the master device 210 enables the dual way communication channel 270 through the transmission channel 260.

In step S315, the controller 220 receives or transmits the dual way demanding message corresponding to the transmission demanding terminal 240 through the dual way communication channel 270. That is, the controller 220 creates a connection with the transmission demanding terminal 240 corresponding to the notice signal through the master device 210 for transmitting the dual way demanding message to or receiving the dual way demanding message from the transmission demanding terminal 240. For example, the dual way demanding message is a demanding message or a response message conforming to the IPMB protocol. The master device 210 can communicate with the transmission demanding terminal 240 using the dual way demanding message, and the controller 220 transmits the dual way demanding message to the transmission demanding terminal 240, or receives the dual way demanding message from the transmission demanding terminal 240.

In another embodiment, when the controller 220 detects that a dual way demanding message exists in the master device 210, the controller 220 enables the dual way communication channel 270 via the transmission channel 260 to connect to the transmission demanding terminal 240 corresponding to the dual way demanding message, and then the controller 220 transmits or receives the dual way demanding message through the dual way communication channel 270. For example, when the controller 220 detects existence of a dual way demanding message (that is, when the master device 210 needs to create a connection with the transmission demanding terminal 240 for the transmission or receiving of a dual way demanding message), the controller 220 in no receiving any notice signal can enable the dual way communication channel 270 corresponding to the dual way demanding message and then create a connection with the transmission demanding terminal 240 for the transmission or receiving of the dual way demanding message.

Figure 4:
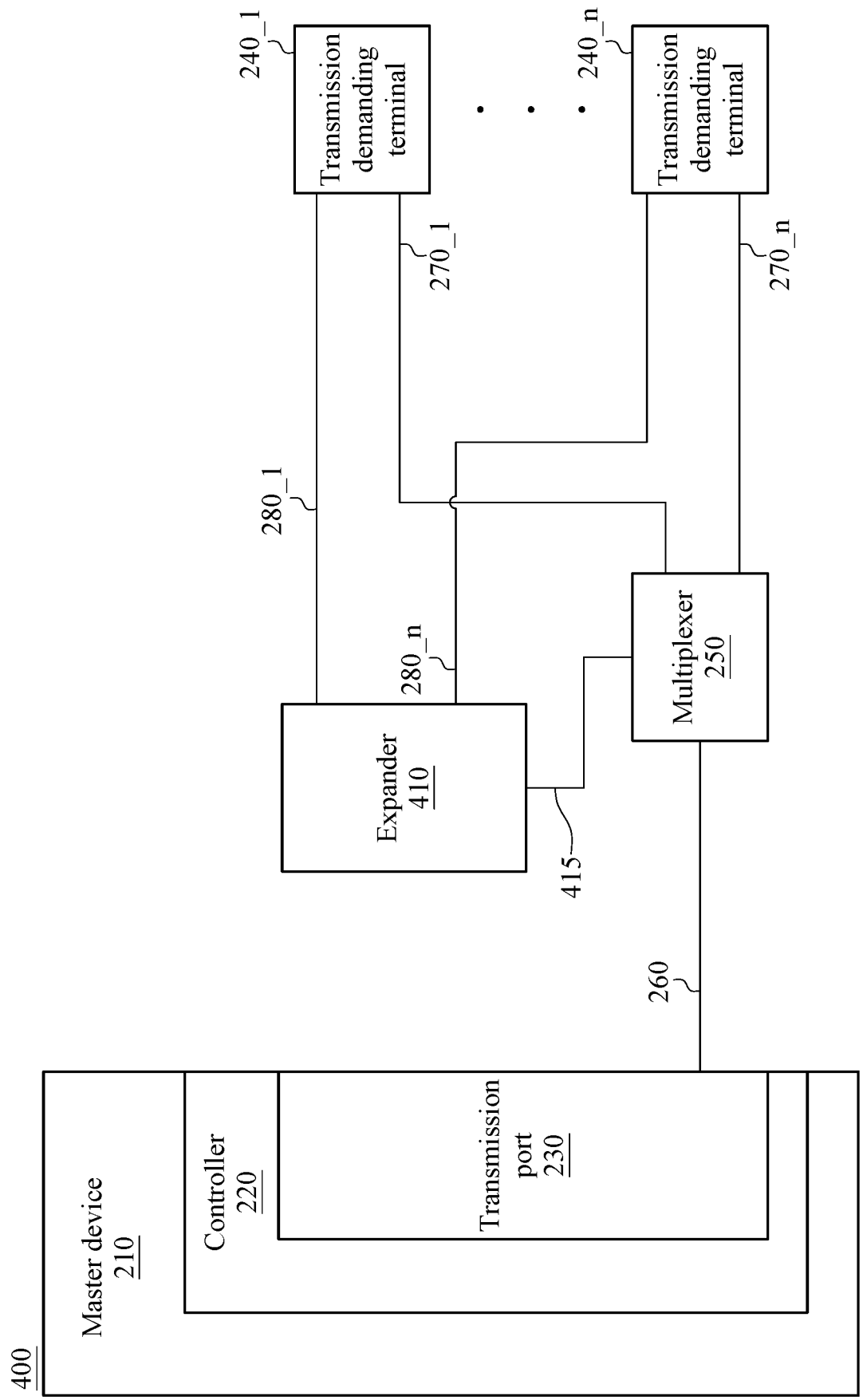
FIG. 4 is a system block diagram of a dual way communication system according to another embodiment of the present disclosure.

Please refer to FIG. 4. FIG. 4 is a system block diagram of a dual way communication system according to another embodiment of the present disclosure. In the dual way communication system 400 in this embodiment, the multiplexer 250 is further connected to an expander 410, and the notifying channels 280 are connected to and between the expander 410 and the transmission demanding terminals 240. The controller 220 is connected to the expander 410 through the transmission channel 260. The controller 220 reads a status signal through the expander 410, and the controller 220 identifies a notice signal, triggered by the transmission demanding terminal 240, according to the status signal. Specifically, the transmission channel 260 is connected to the expander 410 through the multiplexer 250, so as to control the multiplexer 250 through the transmission channel 260 to enable an expanded channel 415 corresponding to the expander 410 and then read the status signal through the expanded channel 415. Therefore, the controller 220 identifies the notice signal in the status signal and can then enable a dual way communication channel 270 corresponding to the notice signal through the multiplexer 250 (in this case, the multiplexer 250 disables the expanded channel 415) and create, for the transmission of a dual way demanding message, a connection to the transmission demanding terminal 240 triggering the notice signal. In another case, when the controller 220 does not detect existence of a notice signal, the controller 220 controls the multiplexer 250 through the transmission channel 260 to disable the dual way communication channel and enable the expanded channel 415 corresponding to the expander 410. Specifically, when all notice signals are processed completely, the controller 220 controls the multiplexer 250 to disable the dual way communication channel and enable the expanded channel 415 so that the controller 220 is connected to the expander 410 for reading a status signal from the expander 410. For a status signal, during the operation described above, the controller 220, for example, accesses a register status in the input port of the expander 410 according to a device address, such as PCA9555. The controller 220 obtains the status of the input port by reading a byte command through an I2C bus, and the expander 410 returns a one-byte status signal. In another embodiment, the expander 410 can return a status signal of more than one byte, and the present disclosure is not limited thereto. Each bit in the status signal corresponds to one of the transmission demanding terminals 240_1~240_n, and represents, by 0 or 1, whether the notice signal corresponding to the bit is triggered. The correlation between each bit and other element(s) can be pre-stored in a storage unit. Therefore, the controller 220 can identify a notice signal, which is sent by the transmission demanding terminal 240, by looking up one or more transmission demanding terminals 240 corresponding to a status signal after reading the status signal, and then the controller 220 can control the multiplexer 250 to enable one or more dual way communication channels to connect to one or more transmission demanding terminals 240 for bidirectional communication.

Figure 5:
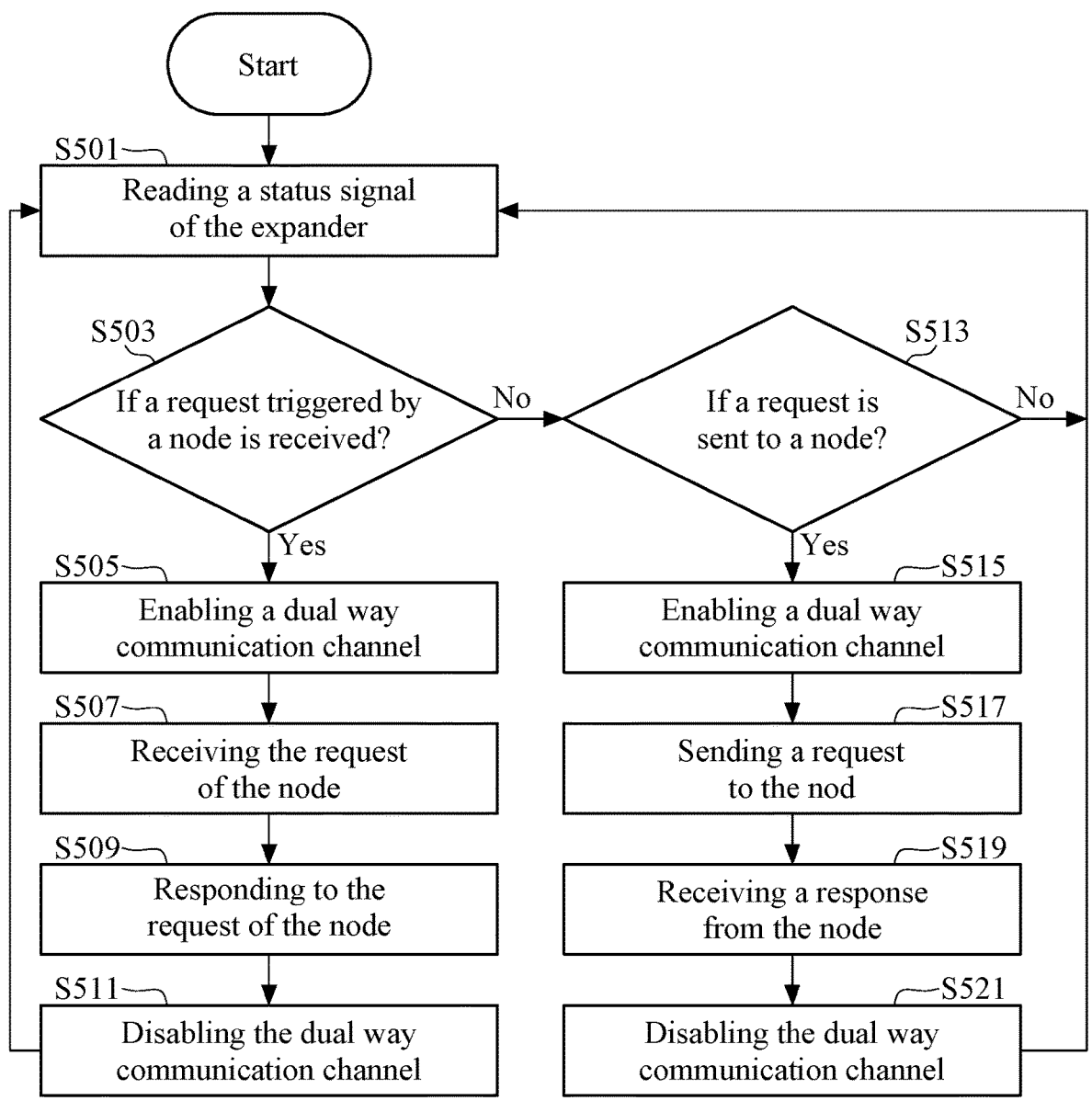
FIG. 5 is a flow chart illustrating steps executed by a master device according to an embodiment of the present disclosure.

Please refer to FIG. 4 and FIG. 5. FIG. 5 is a flow chart illustrating steps executed by the master device 210 according to an embodiment of the present disclosure. In step S501, a status signal is read by the expander 410. For example, the controller 220 periodically reads a status signal via the expander 410 in a predetermined cycle. Then, in step S503, determination of whether the notice signal triggered by the transmission demanding terminal 240 is received is made. In details, the controller 220 recognizes whether each bit in the status signal indicates a notice signal, and searches for the transmission demanding terminal 240 corresponding to the notice signal in the pre-stored correlation information. In step S505, the determination result in step S503 is "yes", a corresponding dual way communication channel 270 is enabled. Specifically, when the controller 220 receives a notice signal triggered by the transmission demanding terminal 240, the controller 220 controls the multiplexer 250 to enable the dual way communication channel 270, so as to connect to the transmission demanding terminal 240 corresponding to the notice signal. In step S507, the dual way demanding message from the transmission demanding terminal 240 is received by the transmission port 230. That is, the controller 220 receives a demanding message from the transmission demanding terminal 240 through the dual way communication channel 270, and the demanding message conforms to an intelligent platform management interface (IPMI) protocol. After the dual way demanding message from the transmission demanding terminal 240 is received, the master device 210 in step S509 responds to the dual way demanding message from the transmission demanding terminal 240. That is, the controller 220 transmits the dual way demanding message to the transmission demanding terminal 240 through the dual way communication channel 270, and the dual way demanding message is a response message conforming to the IPMI protocol. In step S511, the controller 220 disables the dual way communication channel 270 depending on actual requirements. That is, the controller 220 controls the multiplexer 250 to disable the dual way communication channel 270. In an embodiment, when the transmission demanding terminal 240 receives a response message, the transmission is finished (that is, the transmission of the dual way demanding message is completed), the transmission demanding terminal 240 then stops triggering the notice signal and the controller 220 disables the dual way communication channel 270 corresponding to the notice signal through the transmission channel 260. On the other hand, in step S513, determining whether there is any dual way demanding message to be transmitted to a transmission demanding terminal 240 is made when the determination result in step S503 is negative. Specifically, when no notice signal triggered by the transmission demanding terminal 240 is received, the controller 220 detects whether there is a dual way demanding message in the master device 210. When there is no dual way demanding message to be transmitted (i.e. the determination result in step S513 is negative), the procedure returns to step S501 for continuing reading the status signal through the expander 410. When s dual way demanding message is detected in the master device 210 (i.e. the determination result in step S513 is positive), the procedure proceeds to step S515 for enabling the corresponding dual way communication channel 270. Subsequently, the procedure proceeds to step S517 for transmission of the dual way demanding message. Specifically, the controller 220 transmits the dual way demanding message to the transmission demanding terminal 240 through the dual way communication channel 270. For example, the dual way demanding message is a demanding message conforming to the intelligent platform management bus (IPMB) protocol. Next, in step S519, the dual way demanding message is received. In details, the controller 220 receives the dual way demanding message from the transmission demanding terminal 240 through the dual way communication channel 270. Here, the dual way demanding message sent by the transmission demanding terminal 240 is, for example, a response message conforming to the IPMB protocol. In step S521, the dual way communication channel 270 is disabled. Specifically, the controller 220 controls the multiplexer 250 to disable the dual way communication channel 270. After step S521, the procedure returns to step S501 for continuing reading a status signal through the expander 410. Moreover, steps S503 and S513 can be executed in another order. The present disclosure does not intend to limit the priorities of the two steps. In an example, the controller 220 can first perform step S513 for determining whether there is a dual way demanding message to be transmitted to a transmission demanding terminal 240. If there is a dual way demanding message to be transmitted, the procedure proceeds to steps S515~S519, in which the controller 220 enables a dual way communication channel 270 for transmitting the dual way demanding message to the transmission demanding terminal 240 or receiving the dual way demanding message from the transmission demanding terminal 240. If there is no dual way demanding message to be transmitted, the procedure proceeds to step S503 for determining whether a notice signal triggered by the transmission demanding terminal 240 is received. If the notice signal is received, the procedure proceeds to steps S505~S509, in which the controller 220 enables the dual way communication channel 270 corresponding to the notice signal to receive the dual way demanding message from the transmission demanding terminal 240 and respond to the dual way demanding message received from the transmission demanding terminal 240. Then, the dual way communication channel 270 is disabled, and reading a status signal through the expander 410 is continued.

Steps S501~S521 can be performed in a multi-node structure. If multiple nodes (transmission demanding terminals) need to communicate with the master device 210, the master device 210 will receive notice signals and sequentially enable the dual way communication channels 270 corresponding to the notice signals, so as to sequentially communicate with the respective nodes. A node (transmission demanding terminal) that has not been enabled yet keeps waiting until it receives the response of the master device 210. When the corresponding dual way communication channel 270 is enabled, the transmission demanding terminal 240 can obtain the response message sent from the master device 210 or the transmission demanding terminal 240 can send a demanding message to the master device 210 through the enabled dual way communication channel 270. When the communication or data transmission between the master device 210 and the transmission demanding terminal 240 through the enabled dual way communication channel 270 is finished, the transmission demanding terminal 240 stops triggering the notice signal and the master device 210 disables the present channel and enables the dual way communication channel 270 corresponding to a next node (transmission demanding terminal) requiring communication. In this case, this next node (transmission demanding terminal) can receive the response of the master device 210.

Figure 6:
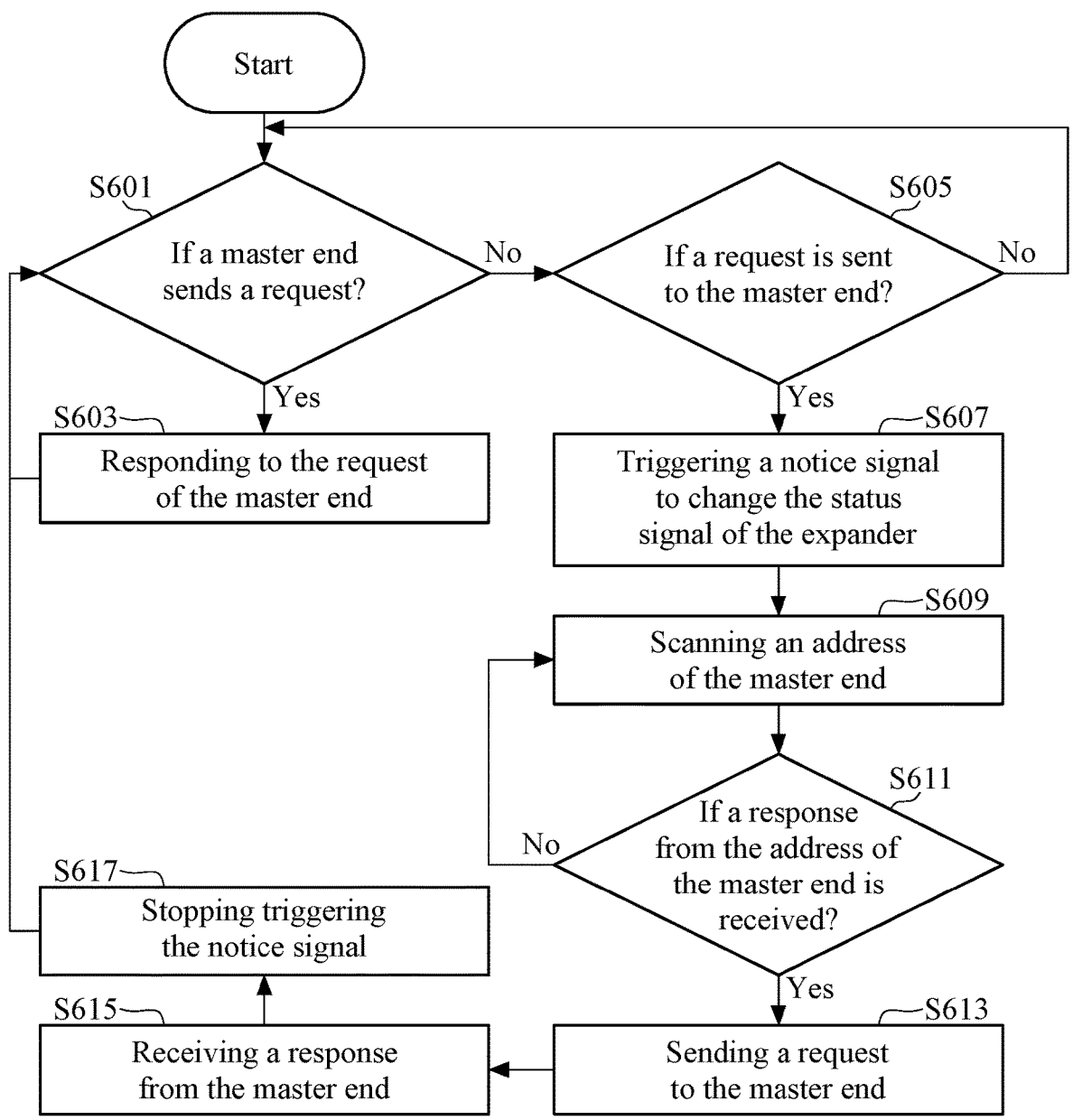
FIG. 6 is a flow chart illustrating steps executed by a transmission demanding terminal according to an embodiment of the present disclosure.

Please refer to FIG. 4 and FIG. 6. FIG. 6 is a flow chart illustrating steps executed by the transmission demanding terminal 240 according to an embodiment of the present disclosure. In step S601, each of the transmission demanding terminals 240 determines whether there is a dual way demanding message received from the master device 210. If yes in step S601, the procedure proceeds to step S603 for responding to the request of the master terminal by transmitting the dual way demanding message to the master device 210. After the transmission of the dual way demanding message in step S603, the procedure returns to step S601 for continuing determining whether there is a dual way demanding message received from the master device 210. When there is not a dual way demanding message received from the master device 210 (if not in step S601), the procedure proceeds to step S605 for determining whether there is a dual way demanding message to be transmitted to the master device 210. When no dual way demanding message needs to be transmitted to the master device 210 in step S605, the procedure returns to step S601 for continuing determining whether there is a dual way demanding message received from the master device 210. When there is a dual way demanding message to be transmitted to the master device 210 in step S605 (if yes in step S605), the procedure proceeds to step S607 for triggering a notice signal by the transmission demanding terminal 240 having the dual way demanding message, so as to change the status signal of the expander 410 (e.g. triggering a high potential signal). Subsequently, in step S609, the existence of a message corresponding to an address of the master device 210 is scanned, and in step S611, determining whether the message corresponding to the address of the master device 210 is received, is made. When no message corresponding to the address of the master device 210 is received, the procedure returns to step S609 for scanning again the existence of a message corresponding to the address of the master device 210. Specifically, after the transmission demanding terminal 240 triggers a notice signal, the transmission demanding terminal 240 continuously scans the existence of a message corresponding to the address of the master device 210 until the transmission demanding terminal 240 receives a message corresponding to the address of the master device 210. In this case, the address of the master device 210 is, for example, a dual way demanding message, other online message, a linking message or a notice message, and the present disclosure is not limited thereto. Then, when a message corresponding to the address of the master device 210 is received (if yes in step S611), the procedure proceeds to step S613 for transmitting a dual way demanding message to the master device 210. In step S615, the dual way demanding message from the master device 210 is received so that the response of the master device 210 is received. Next, in step S617, triggering a notice signal is stopped. After that, the procedure returns to step S601 for continuing determining whether a dual way demanding message from the master device 210 is received.

In another embodiment, steps S601 and S605 can be executed in another order. For example, the transmission demanding terminal 240 may first execute step S605 for determining whether there is a dual way demanding message to be transmitted to the master device 210. When there is a dual way demanding message to be transmitted to the master device 210 in step S605, the procedure proceeds to steps S607~S617; and otherwise, when there is no dual way demanding message to be transmitted to the master device 210 in step S605, the procedure proceeds to step S601.

Figure 7:
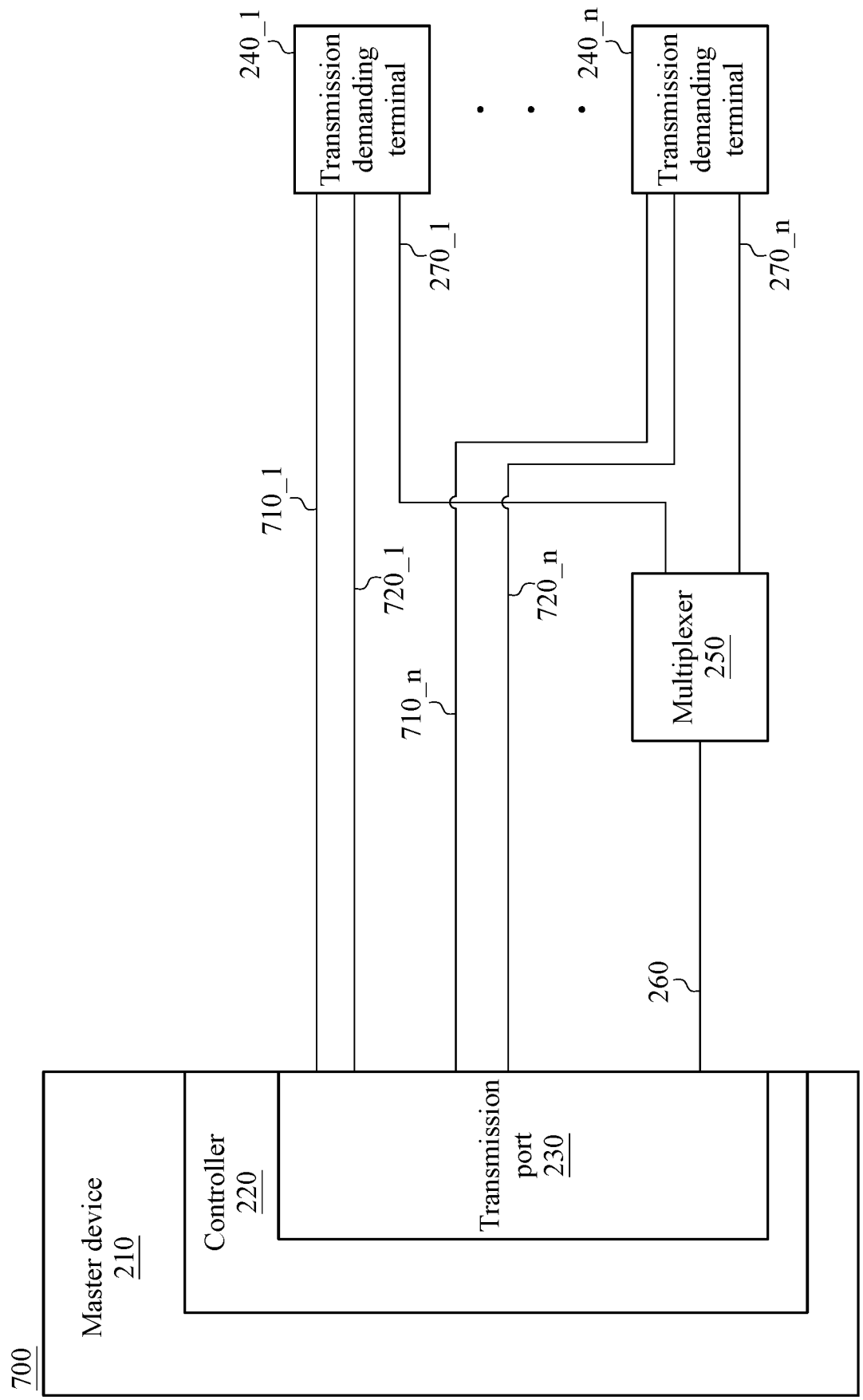
FIG. 7 is a system block diagram of a dual way communication system according to yet another embodiment of the present disclosure.

As shown in FIG. 7, a system block diagram of a dual way communication system 700 according to yet another embodiment of the present disclosure is present. In this embodiment, a high priority notice channel 710 and a low priority notice channel 720 are connected to and between each of the transmission demanding terminals 240 and the transmission port 230 (i.e. the number of high priority notice channels 710 and the number of low priority notice channels 720 correspond to the number of transmission demanding terminals 240, and totally, n high priority notice channels 710_1~710_*n* and n low priority notice channels 720_1~720_*n* are included), and each of the transmission demanding terminals 240 can trigger a high priority notice signal or a low priority notice signal according to a priority of the dual way demanding message. The high priority notice signal can be transmitted to the controller 220 through the high priority notice channel 710, and the low priority notice signal can be transmitted to the controller 220 through the low priority notice channel 720. Further, a dual way demanding message corresponding to the high priority notice signal is first transmitted or received by the master device 210. The dual way demanding message is, for example, a high priority demanding message, a low priority demanding message, a high priority response message or low priority response message conforming to the IPMB protocol. Moreover, only a part of the transmission demanding terminals 240 may be connected to the transmission port 230 through the high priority notice channels 710 and the low priority notice channels 720, but it depends.

In another embodiment, when the controller 220 detects a high priority dual way demanding message exists in the master device 210, the controller 220 first enables a dual way communication channel 270 through the transmission channel 260, so as to connect to a transmission demanding terminal 240 corresponding to the high priority dual way demanding message, and then transmits or receives the high priority dual way demanding message through the dual way communication channel 270. Specifically, the transmission demanding terminal 240 considers that all dual way demanding messages received from the master device 210 are high priority demanding messages, and after processing them, correspondingly triggers high priority notice signals. When the master device 210 detects the existence of the high priority notice signal triggered by the transmission demanding terminal 240, then the master device 210 first controls the multiplexer 250 to enable a dual way communication channel corresponding to the high priority notice signal for the transmission of the dual way demanding message to or the receiving of the dual way demanding message from the transmission demanding terminal 240 triggering the high priority notice signal. In this case, the dual way demanding message is, for example, a high priority demanding message or a high priority response message conforming to the IPMB protocol. Moreover, a respective transmission demanding terminal 240 can trigger a low priority notice signal through a respective low priority notice channel 720, and the master device 210 first transmits or receives a dual way demanding message corresponding to the high priority notice signal as compared to transmitting or receiving a dual way demanding message corresponding to the low priority notice signal. In another embodiment, after the controller 220 of the master device 210 transmits multiple dual way demanding messages to multiple transmission demanding terminals 240 through the dual way communication channels 270, the controller 220 of the master device 210 is waiting until a transmission demanding terminal 240 triggers a high priority notice signal. After a transmission demanding terminal 240 triggers a high priority notice signal, the controller 220 of the master device 210 receives a dual way demanding message from the transmission demanding terminal 240 triggering the high priority notice signal. In this case, the dual way demanding message sent from the transmission demanding terminal 240 is, for example, a high priority response message.

Figure 8:
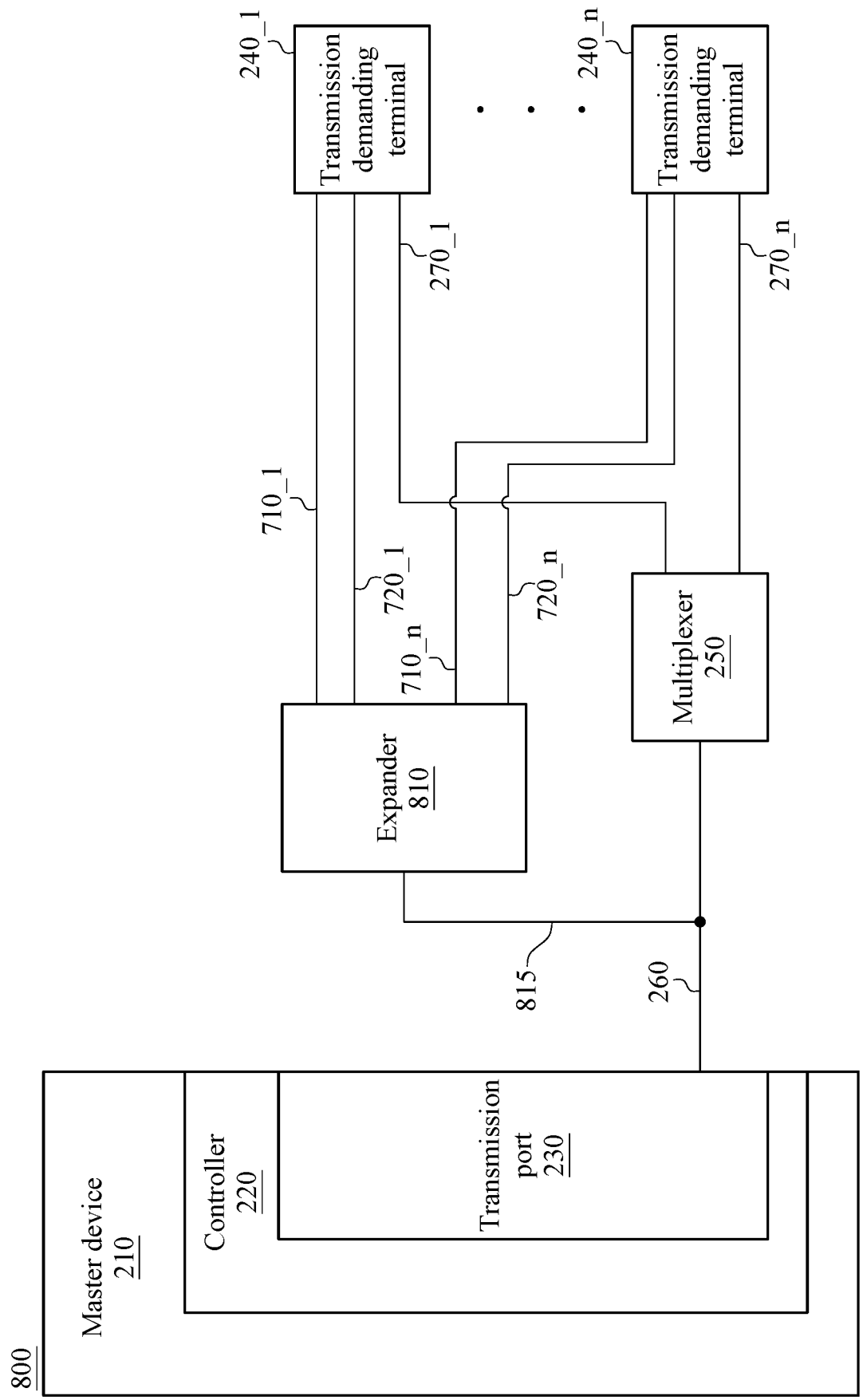
FIG. 8 is a system block diagram of a dual way communication system according to yet another embodiment of the present disclosure.

Please refer to FIG. 8. FIG. 8 is a system block diagram of a dual way communication system 800 according to yet another embodiment of the present disclosure. In this embodiment, a high priority notice channel 710 and a low priority notice channel 720 are connected to and between each of the transmission demanding terminals 240 and the expander 810 (the number of high priority notice channels 710 and the number of low priority notice channels 720 correspond to the plurality of transmission demanding terminals 240, and totally, n high priority notice channels 710_1~710_n and n low priority notice channels 720_1~720_n are included). The expander 810 is connected to the master device 210 through the transmission channel 260, and the transmission demanding terminal 240, according to the priority of a respective dual way demanding message, triggers a high priority notice signal or a low priority notice signal through a respective high priority notice channel 710 or a respective low priority notice channel 720. The controller 220 of the master device 210 reads a status signal through the expander 810, and the controller 220, according to the status signal, identifies the high priority notice channel 710 or the low priority notice channel 720 triggered by the transmission demanding terminal 240. Specifically, the controller 220 of the master device 210 is connected to the expander 810 using a slave address different from the slave address of the multiplexer 250, and different slave addresses can be used by the controller 220 to distinguish the connection with the multiplexer 250 and the connection with the expander 810. When the controller 220 appoints a slave address corresponding to the expander 810 for transmission or receiving, the controller 220 can be connected to the expander 810 through the transmission channel 260 and the expanded channel 815, so as to read a status signal. After the controller 220 reads a status signal, then the controller 220 can know which respective transmission demanding terminal(s) 240 triggers a high priority notice signal. The master device 210 first enables a dual way communication channel 270 corresponding to the high priority notice signal and connects the transmission demanding terminal 240 triggering the high priority notice signal, to first receive or transmit a dual way demanding message corresponding to the high priority notice signal. As compared to the embodiment shown in FIG. 4, the connection manner used in the expander 810 shown in FIG. 8 may reduce the number of channels occupied so that the multiplexer 250 can connect to more transmission demanding terminals 240. In another embodiment, if the controller 220 detects multiple high priority notice signals in the status signal, the controller 220, according to a predetermined order, sequentially enables dual way communication channels 270 corresponding to the high priority notice signals, to receive or transmit dual way demanding messages corresponding to the high priority notice signals. In another embodiment, after the transmission demanding terminal 240 trigger one or more high priority notice signals or one or more low priority notice signals according to the priority(s) of the dual way demanding message(s), the master device 210 correspondingly receives the dual way demanding message(s) constituted by the high priority demanding message(s) or the low priority demanding message(s) and the transmission demanding terminal 240 can then disable the high priority notice signal(s) or the low priority notice signal(s). After the master device 210 receives the high priority notice signal(s) or the low priority notice signal(s), the master device 210 controls the multiplexer 250 to temporarily disable the dual way communication channel(s) 270. Then, after the master device 210 finishes processing the high priority demanding message(s) or the low priority demanding message (s) corresponding to the dual way demanding message(s), the master device 210 enables the corresponding dual way communication channel(s) 270 to connect to the transmission demanding terminal(s) 240 for the transmission of the corresponding dual way demanding message(s). In this case, this dual way demanding message is, for example, a high priority response message or a low priority response message. Accordingly, the master device 210 can receive and finishes processing more than one dual way demanding message and then respond to the respective dual way demanding message completely processed by each transmission demanding terminal 240. In another embodiment, when the controller 220 detects that a high priority dual way demanding message exists in the master device 210, the controller 220 first enables the dual way communication channel 270 through the transmission channel 260 to connect to the transmission demanding terminal 240 corresponding to the high priority dual way demanding message and then transmit or receive the high priority dual way demanding message through the dual way communication channel 270. For example, when the controller 220 finishes processing the above high priority demanding message, the controller 220 needs to return a corresponding dual way demanding message to the transmission demanding terminal 240 sending the high priority demanding message; and in this case, the controller 220 can consider that this dual way demanding message is a high priority dual way demanding message, and can transmit the high priority dual way demanding message through the dual way communication channel 270.

Figure 9A:
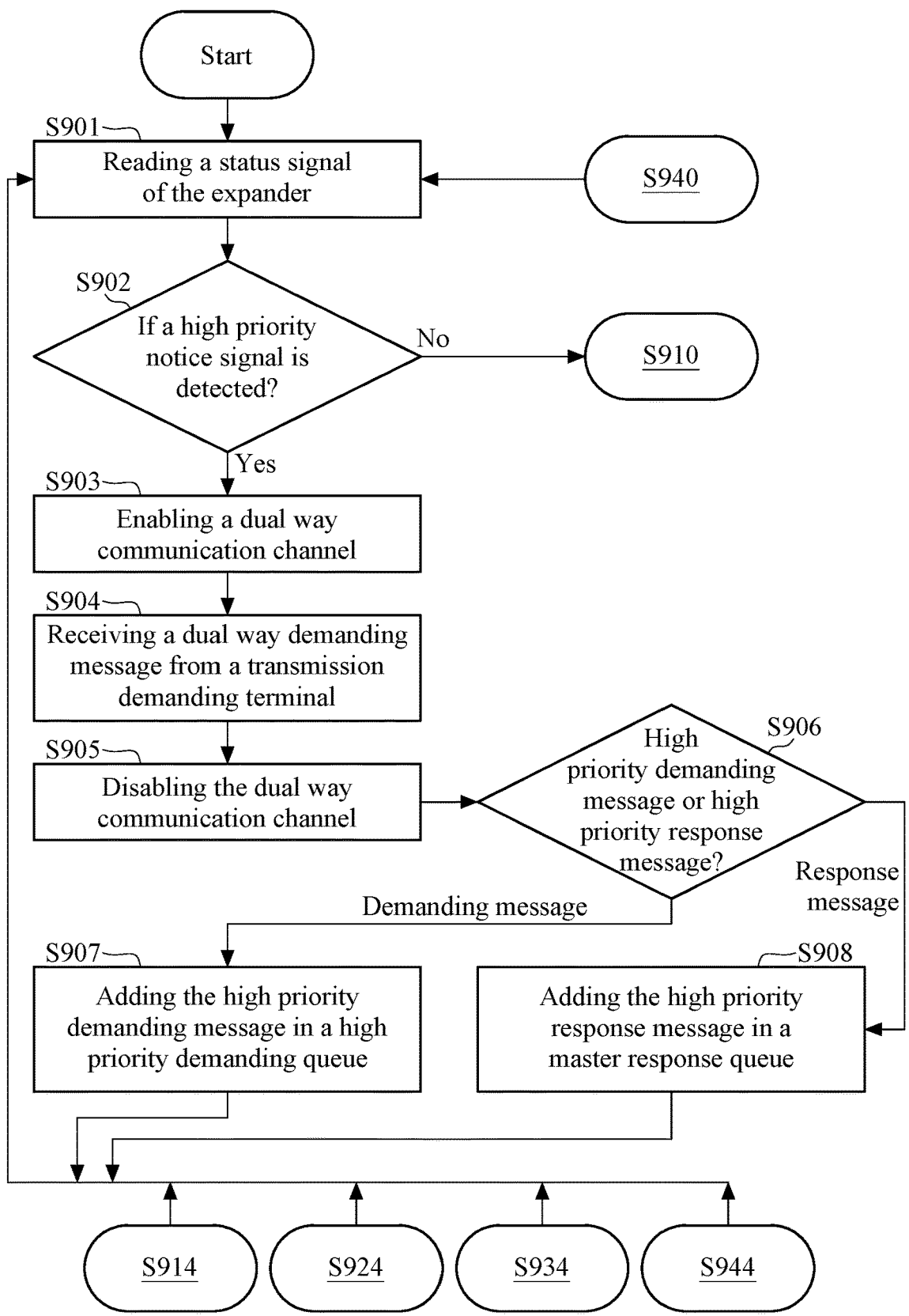
FIG. 9A and FIG. 9C are flow charts illustrating steps executed by a master device according to another embodiment of the present disclosure.
Figure 9B:
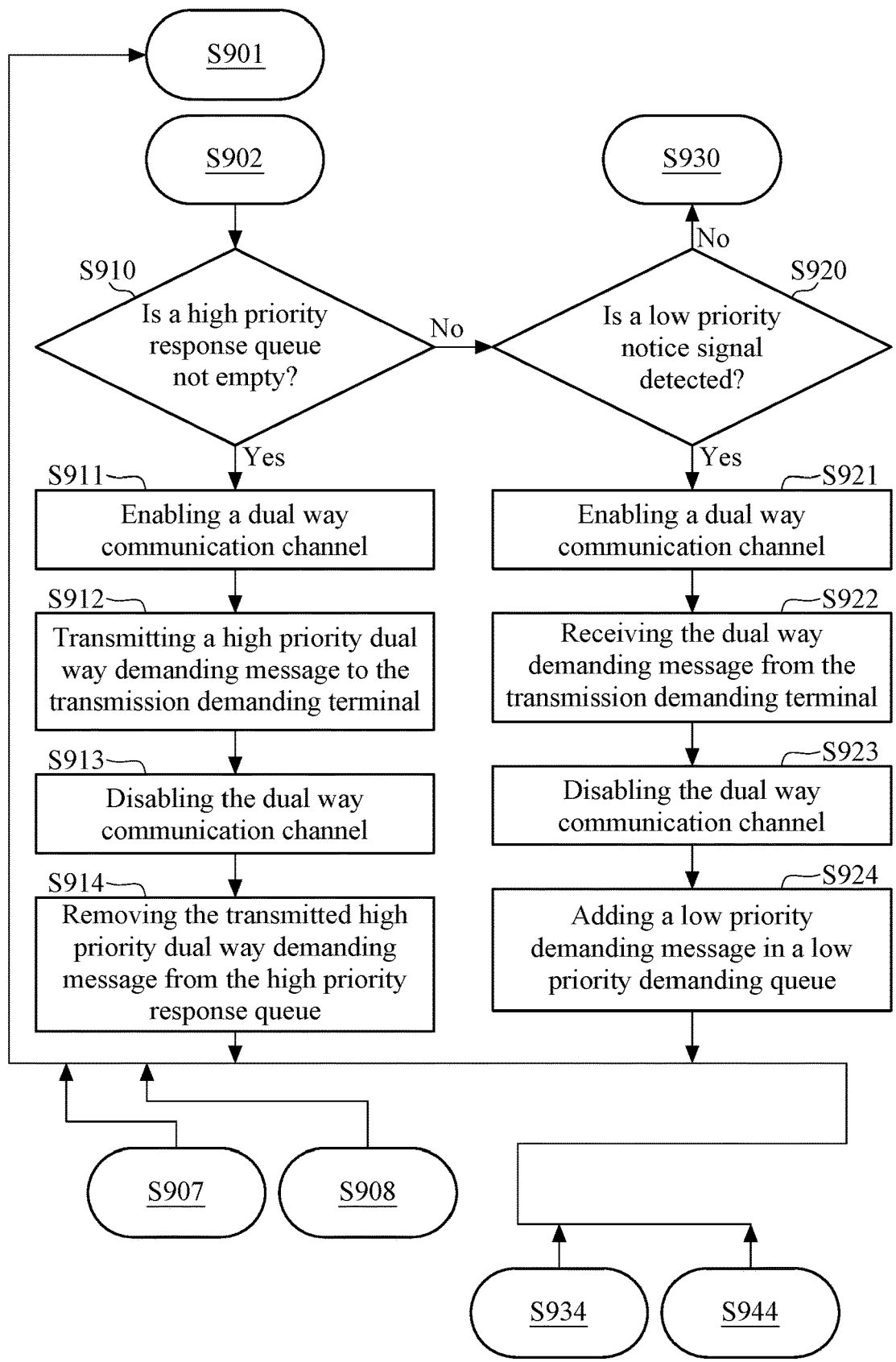
Figure 9C:
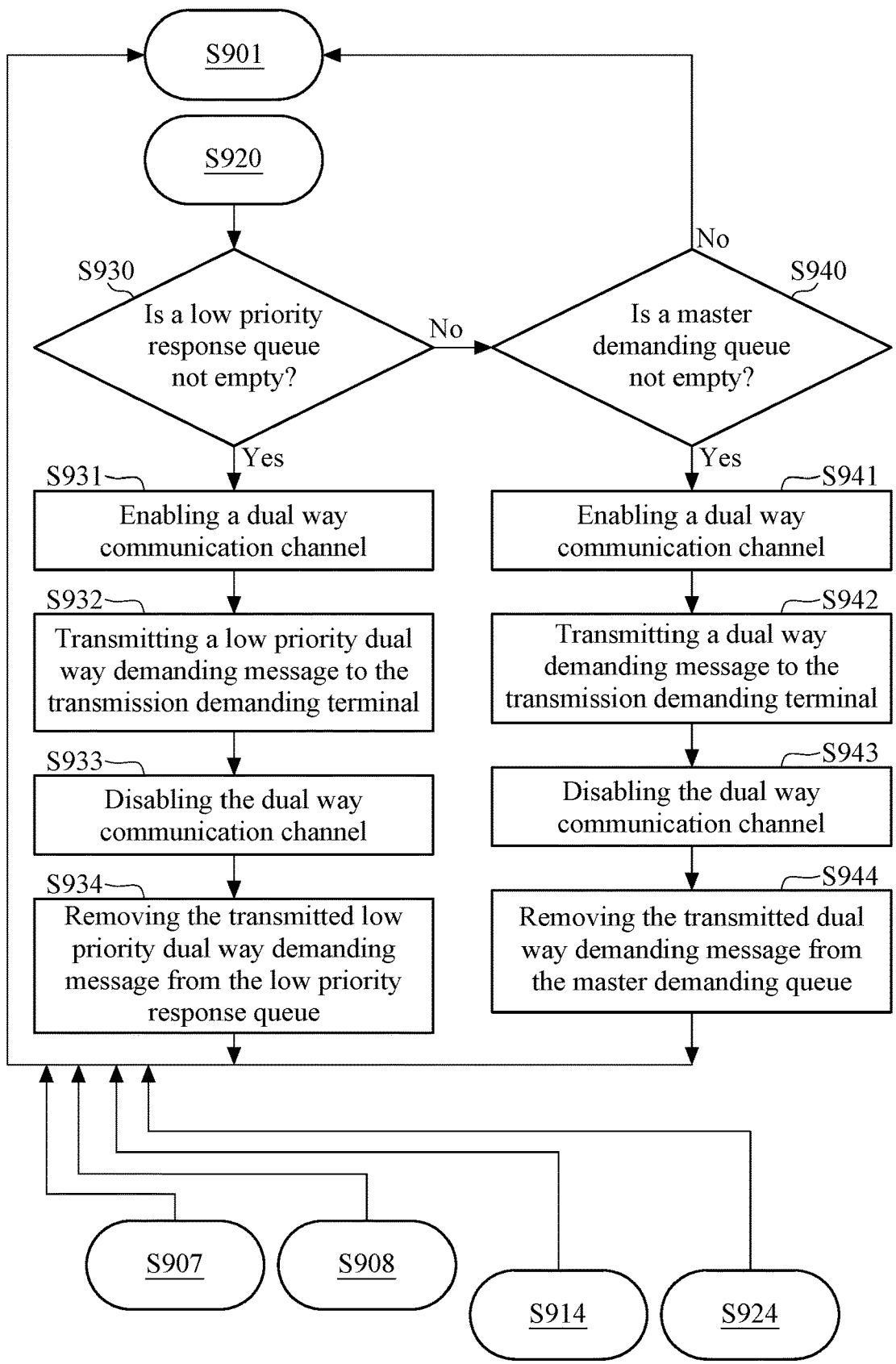

Please refer to FIG. 7, FIG. 8 and FIG. 9A to FIG. 9C. FIG. 9A to FIG. 9C together provide a flow chart illustrating steps executed by the master device according to another embodiment of the present disclosure. In step S901, the controller 220 of the master device 210 reads a status signal of the expander 810. In the case of no expander in the embodiment shown in FIG. 7, step S901 can be omitted and step S902 can be execute directly. In step S902, the controller 220 determines whether a high priority notice signal is detected. When the controller 220 detects the existence of a high priority notice signal, the procedure proceeds to step S903 for controlling the multiplexer 250 to enable a dual way communication channel 270 corresponding to the high priority notice signal. Then, in step S904, the dual way demanding message from the transmission demanding terminal 240 is received by the transmission port 230. In step S905, the controller 220 disables the dual way communication channel 270. In step S906, determining that the received dual way demanding message is a high priority demanding message sent by the transmission demanding terminal 240 or is a high priority response message that the transmission demanding terminal 240 responds to the request of the master device 210. If the received dual way demanding message is a high priority demanding message, this high priority demanding message is added in a high priority demanding queue in step S907. If the received dual way demanding message is a high priority response message, this high priority response message is added in a master response queue in step S908. If no high priority notice signal is detected, the procedure proceeds to step S910 for checking whether a high priority dual way demanding message to be processed exists in a high priority response queue. In this case, this high priority dual way demanding message is, for example, a high priority response message to be transmitted to the transmission demanding terminal 240 by the master device 210, and the high priority response queue records a high priority response message that the master device 210 responds to the transmission demanding terminal 240. If there is a high priority dual way demanding message to be processed, the procedure proceeds to step S911 for controlling the multiplexer 250 to enable a dual way communication channel 270 corresponding to the high priority dual way demanding message, Then, in step S912, the high priority dual way demanding message is sent to the transmission demanding terminal 240. In step S913, the dual way communication channel 270 is disabled. The procedure further proceeds to step S914 for deleting from the high priority response queue all high priority dual way demanding messages completely sent. Subsequently, the procedure proceeds to step S901 for reading the status signal of the expander 810. Otherwise, if no high priority notice signal is detected and no high priority dual way demanding message to be processed exists in the high priority response queue, the procedure proceeds to step S920 for determining whether the existence of a low priority notice signal is detected by the controller 220. If the controller 220 detects the existence of a low priority notice signal, the controller 220 controls the multiplexer 250 to enable the dual way communication channel 270 corresponding to the low priority notice signal in step S921. Then, in step S922, the dual way demanding message from the transmission demanding terminal 240 is received. Here, the dual way demanding message is, for example, a low priority demanding message corresponding to the low priority notice signal. In step S923, the dual way communication channel 270 is disabled. After that, the procedure proceeds to step S924 for adding the low priority demanding message in a low priority demanding queue. Then, the procedure proceeds to step S901 for reading a status signal of the expander 810. In another embodiment, before step S924, it is further done to determine whether the received dual way demanding message is a low priority demanding message or a low priority response message sent by the transmission demanding terminal 240. When the received dual way demanding message is a low priority demanding message sent by the transmission demanding terminal 240, the procedure proceeds to step S924 for adding the low priority demanding message to the low priority demanding queue. When the received dual way demanding message is a low priority response message, the low priority response message is added to another queue or is stored in a storage unit. Note that according to actual requirements, it can be designed that response messages sent by all the transmission demanding terminals 240 (i.e. the responses of the transmission demanding terminals 240 to the requests of the master device 210) are set as high priority response messages and high priority notice signals are triggered correspondingly. After step S923, it is unnecessary to determine whether the message is a low priority demanding messages or a low priority response message, and the low priority demanding message is added to the low priority demanding queue. When neither a high priority notice signal nor a low priority notice signal is detected and there is no high priority dual way demanding message to be processed in the high priority response queue, the procedure proceeds to step S930 for checking whether there is a low priority dual way demanding message to be processed in the low priority response queue. Here, the low priority dual way demanding message is, for example, a low priority response message to be transmitted to the transmission demanding terminal 240 by the master device 210, and the low priority response message that the master device 210 responds to the transmission demanding terminal 240 is added in the low priority response queue. When there is a low priority dual way demanding message to be processed, the procedure proceeds to step S931 for controlling the multiplexer 250 to enable the dual way communication channel 270 corresponding to the low priority dual way demanding message. Next, in step S932, the low priority dual way demanding message is sent to the transmission demanding terminal 240. In step S933, the dual way communication channel 270 is disabled. In step S934, each low priority dual way demanding message that has been sent is removed from the low priority response queue. After that, the procedure returns to step S901 for reading the status signal of the expander 810. When no high priority notice signal, no high priority dual way demanding message to processed, no low priority notice signal, and no low priority dual way demanding message to be processed is detected, the procedure proceeds to step S940 for checking whether there is a dual way demanding message to be processed in a master demanding queue. Here, the dual way demanding message to be processed is, for example, a demanding message to be transmitted to the transmission demanding terminal 240 by that the master device 210. Then, the procedure proceeds to step S941 for controlling the multiplexer 250 to enable the dual way communication channel 270 corresponding to the dual way demanding message. In step S942, the dual way demanding message is transmitted to the transmission demanding terminal 240. In step S943, the dual way communication channel 270 is disabled. Next, in step S944, each dual way demanding message that has been sent is removed from the master demanding queue. Subsequently, the procedure returns to step S901 for reading the status signal of the expander 810. When no high priority notice signal, no high priority dual way demanding message, no low priority notice signal, and no low priority dual way demanding message is detected and no dual way demanding message to be processed existing in the master demanding queue is detected, the procedure returns to step S901 for reading the status signal of the expander 810. Specifically, the high priority demanding queue, the high priority response queue, the master response queue, the master demanding queue, the low priority demanding queue and the low priority response queue are stored in one or more storage units of the master device 210 (not shown in the drawings). In another embodiment, priorities of steps S902~S908, steps S910~S914, steps S920~S924, steps S930~S934 and steps S940~S944 can be changed. For example, step S910 can first be executed to check whether there is a high priority dual way demanding message to be processed existing in the high priority response queue. If yes, the procedure proceeds to steps S911~S914 and then proceeds to step S920 for determining whether a high priority notice signal is detected. If yes, the procedure proceeds to steps S903~S908. Optionally, step S940 for checking whether there is a dual way demanding message to be processed existing in the master demanding queue, is first executed in another embodiment before steps S920. If yes, the procedure proceeds to steps S941~942. Then, the procedure proceeds to step S920 for determining whether the existence of a low priority notice signal is detected. If yes, the procedure proceeds to steps S921~S924. In another embodiment, step S940 can be executed before step S902. Specifically, arranging the steps of determination related to the high priority elements to be performed before the steps of determination related to the low priority elements allows first coping with high priority responses or requests, but the present disclosure is not limited thereto and can be modified according to actually requirements. For example, the processing of regular events, such as routine transmission of temperature, voltage, electrical current, fan status information, is set to have low priority. Rather, the transmission of information about error situations, such as overtemperature, undervoltage, overvoltage, overcurrent, fan failure and so on, is set to have high priority. Optionally, the transmission of time-sensitive information about, for example, the rebooting of the transmission demanding terminal 240, time synchronization, firmware updating, the synchronization of error event records, the limiting of power consumption and so on, is set to have high priority. However, the present disclosure is not limited to these examples, and in practice, the setting of priority can be defined according to the requirements of the system's operation.

Figure 10A:
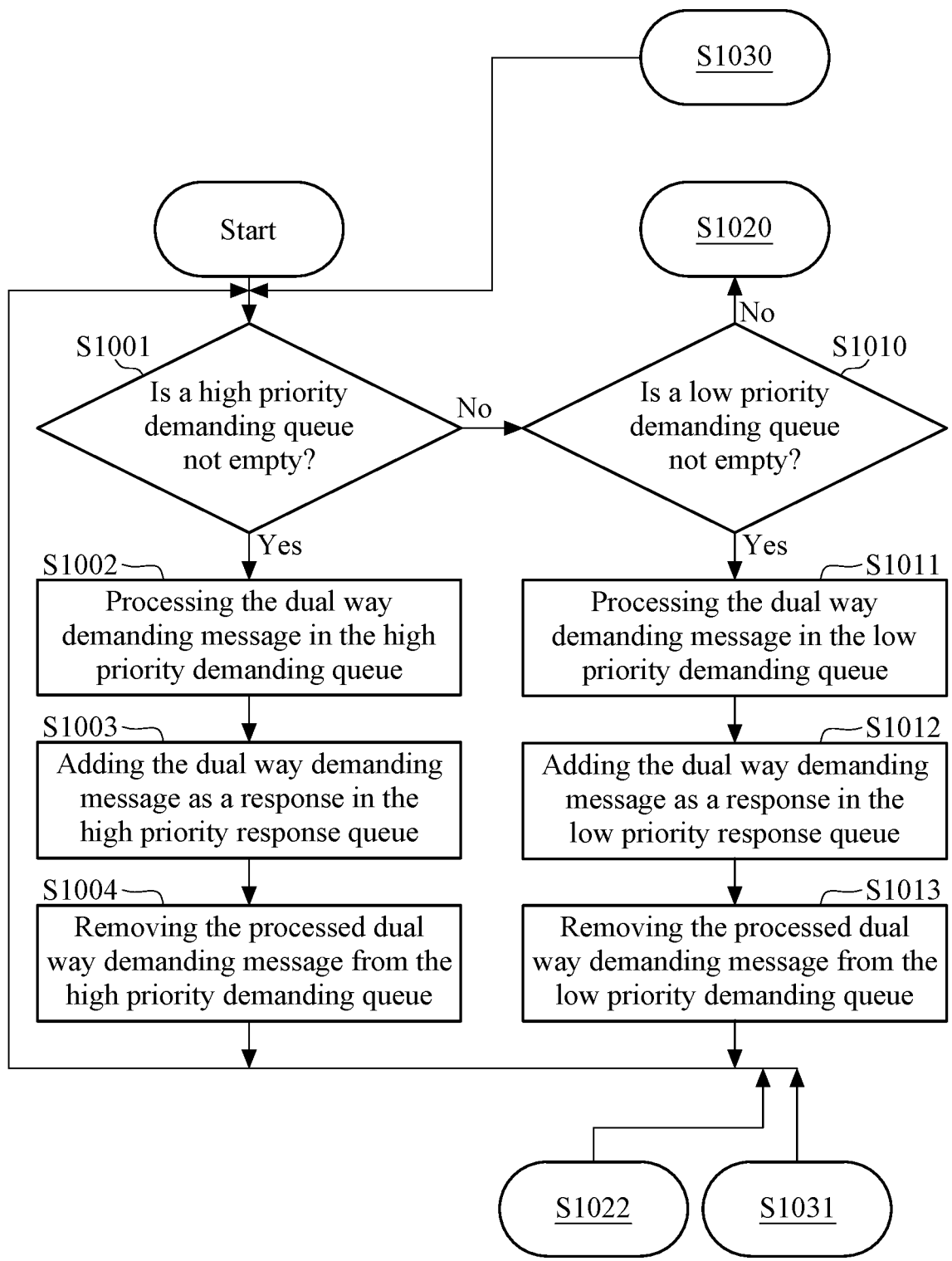
FIG. 10A and FIG. 10B are flow charts illustrating that a master device processes a dual way demanding message according to an embodiment of the present disclosure.
Figure 10B:
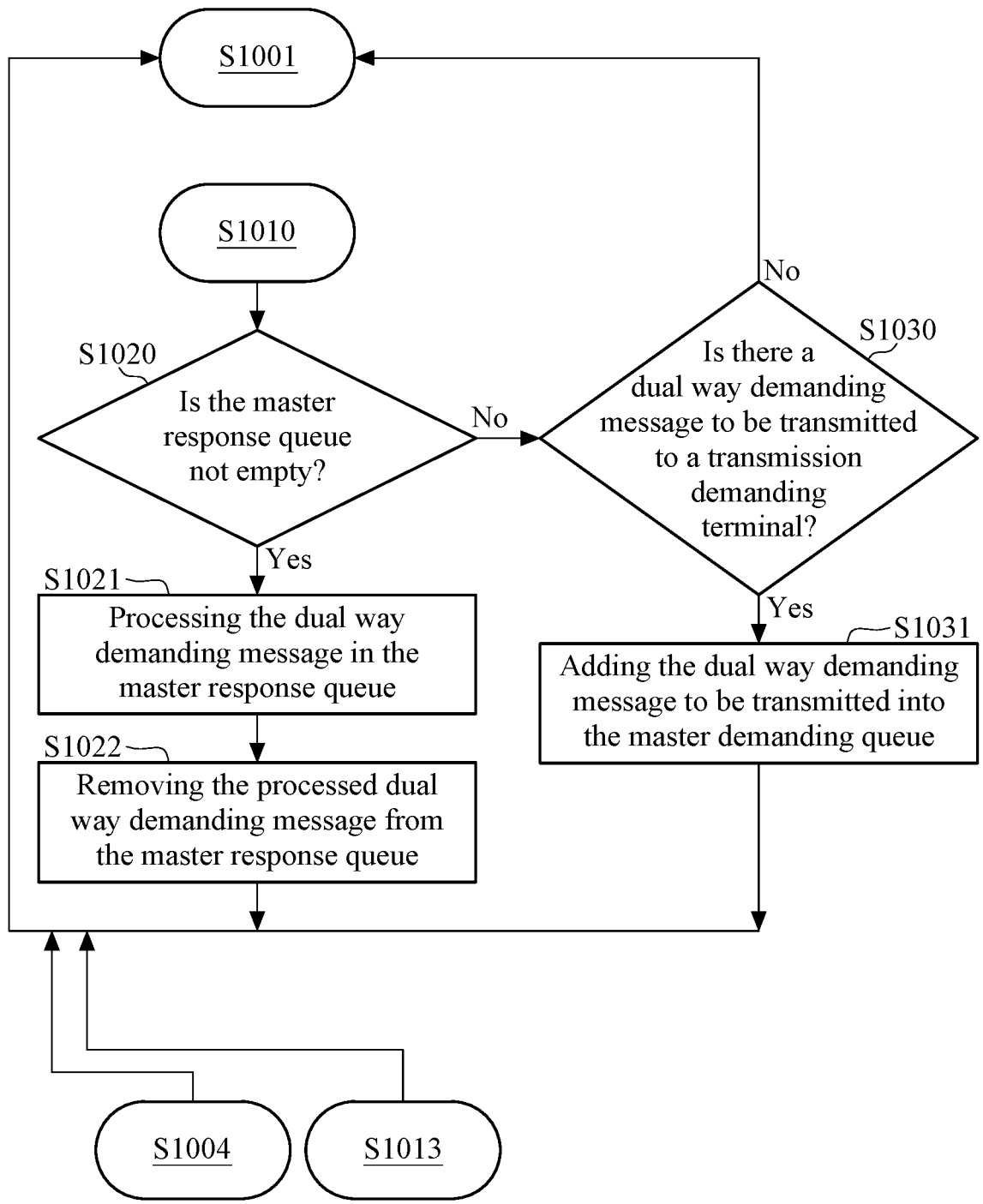

Please refer to FIG. 9A to FIG. 9C, FIG. 10A and FIG. 10B. FIG. 10A and FIG. 10B together provide a flow chart illustrating that the master device processes one or more dual way demanding messages according to an embodiment of the present disclosure. In step S1001, the controller 220 determines whether there is a dual way demanding message (i.e. the high priority demanding message transmitted by the transmission demanding terminal 240) existing in the high priority demanding queue. If yes, the procedure proceeds to step S1002 for processing the dual way demanding message in the high priority demanding queue. For example, the controller 220 analyzes and matches the content in the dual way demanding message to correspondingly generate a dual way demanding message used as a response to the transmission demanding terminal 240. Here, this dual way demanding message is, for example, a high priority response message, such as a confirmation message, an agreement message, an instruction message and so on, issued by the master device 210 after the controller 220 analyzes and compares the content of the dual way demanding message. Then, in step S1003, the dual way demanding message used as a response to the transmission demanding terminal 240 is added in the high priority response queue. Next, the procedure proceeds to step S1004 for removing from high priority demanding queue each dual way demanding message that has been processed. After that, the procedure returns to step S1001 for continuing determining whether there is a dual way demanding message in the high priority demanding queue. If not, the procedure proceeds to step S1010 for determining whether there is a dual way demanding message (i.e. the low priority demanding message transmitted by the transmission demanding terminal 240) existing in the low priority demanding queue. If yes, the procedure proceeds to step S1011 for processing the dual way demanding message existing in the low priority demanding queue. Then, in step S1012, the dual way demanding message used as a response to the transmission demanding terminal 240 is added in the low priority response queue. Next, the procedure proceeds to step S1013 for removing from the low priority demanding queue each dual way demanding message that has been processed. After that, the procedure returns to step S1001. When there is no dual way demanding message in the high priority demanding queue and the low priority demanding queue, the procedure proceeds to step S1020 for determining whether there is a dual way demanding message (i.e. the high priority response message that is used by the transmission demanding terminal 240 to respond to the master device 210) existing in the master response queue. If yes, the procedure proceeds to step S1021 for processing the dual way demanding message in the master response queue. For example, the controller 220 matches the received high priority response message to the demanding message previously sent, and further checks the high priority response message and accordingly stores the content of the high priority response message or records the high priority response message. Then, the procedure proceeds to step S1022 for removing from the master response queue each dual way demanding message that has been processed. After that, the procedure returns to step S1001. When neither the high priority demanding queue, the low priority demanding queue nor the master response queue has a dual way demanding message, the procedure proceeds to step S1030 for determining whether there is a dual way demanding message to be transmitted to the transmission demanding terminal 240. Specifically, the dual way demanding message is, for example, a demanding message to be transmitted to the transmission demanding terminal 240 by the master device 210. If yes, the procedure proceeds to step S1031 for adding to the master demanding queue the dual way demanding message to be transmitted to the transmission demanding terminal 240, and being waiting until the controller 220 transmits the dual way demanding message. After that, the procedure returns to step S1001 for continuing determining whether there is a dual way demanding message in the high priority demanding queue.

Steps S1001, S1010, S1020 and S1030 can be executed in another order. For example, the determination in step S1030 (determining whether there is a dual way demanding message to be transmitted to the transmission demanding terminal 240) can first be performed, and the determinations in steps S1001, S1010 and S1020 are performed later. Optionally, in another embodiment, if the determination result in step S1001 is negative (i.e. the high priority demanding queue is empty), the determination in step S1020 (i.e. determining whether there is a dual way demanding message in the master response queue) is first performed, and then step S1010 is performed for determining whether there is a dual way demanding message in the low priority demanding queue. As described above, the order of the steps in the present disclosure can be changed according to actual requirements; and for example, steps of determination related to high priority elements can be performed for first processing high priority requests before steps of determination related to low priority elements.

Figure 11A:
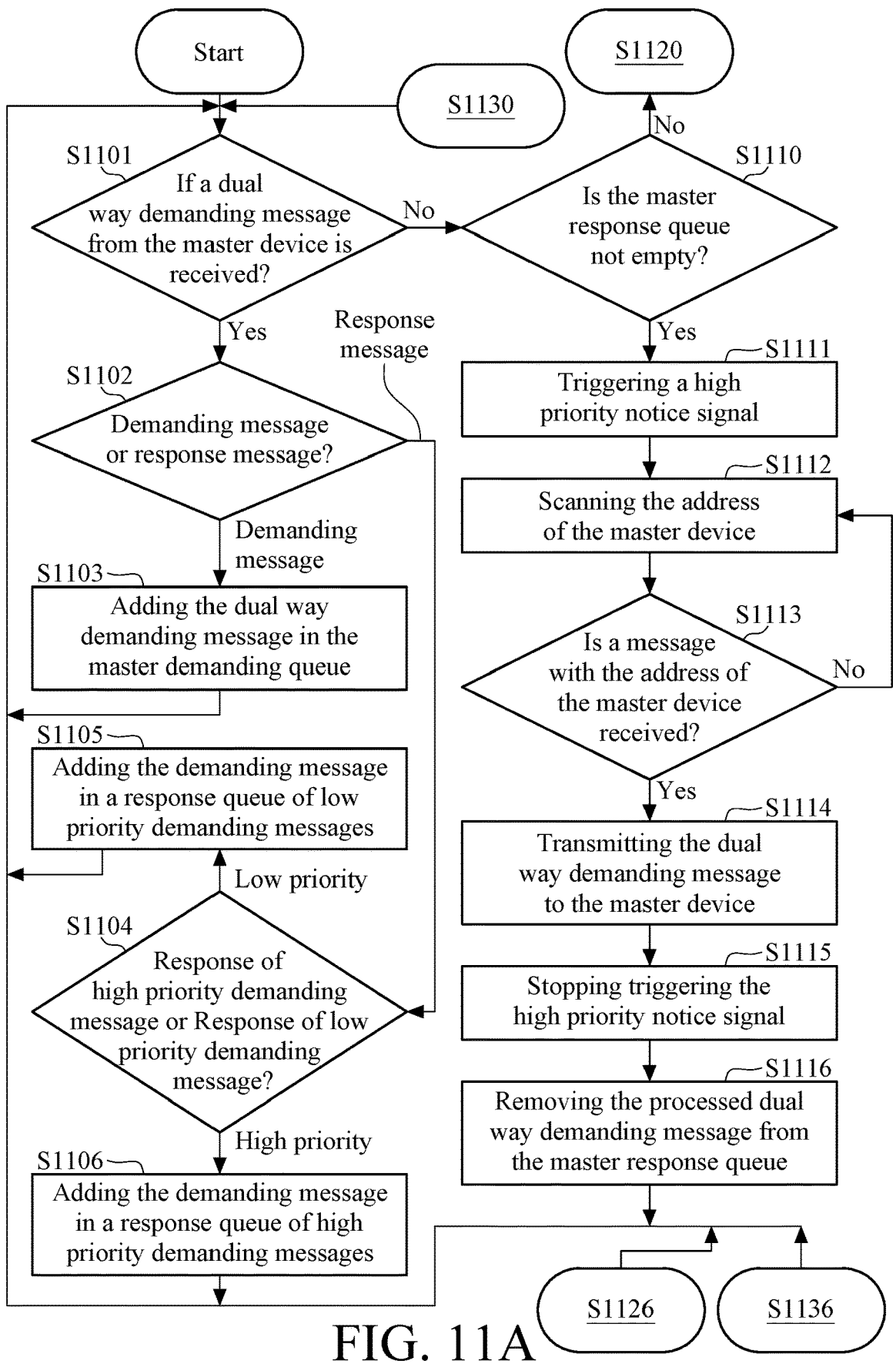
FIG. 11A and FIG. 11B are flow charts illustrating steps executed by a transmission demanding terminal according to another embodiment of the present disclosure.
Figure 11B:
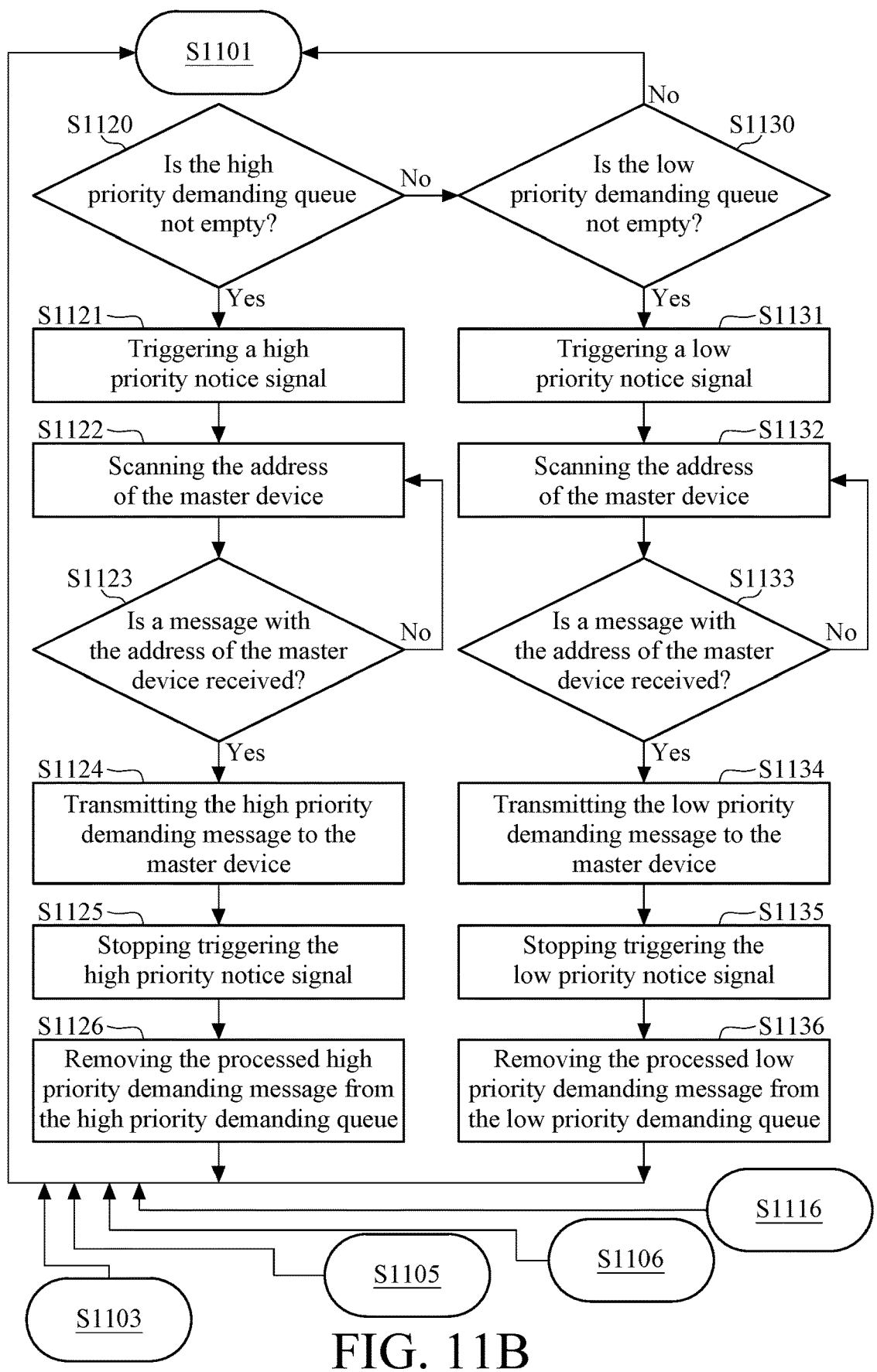

Please refer to FIG. 7, FIG. 8, FIG. 11A and FIG. 11B. FIG. 11A and FIG. 11B together provide a flow chart illustrating the steps executed by the transmission demanding terminal according to another embodiment of the present disclosure. In step S1101, the transmission demanding terminal 240 determines whether a dual way demanding message from the master device 210 is received. If yes, the procedure proceeds to step S1102 for determining that the received dual way demanding message is a demanding message or a response message. In detail, the transmission demanding terminal 240 can, according to the content of the dual way demanding message, determine that it is a demanding message or a response message. If the received dual way demanding message is a demanding message, the procedure proceeds to step S1103 for adding this dual way demanding message into the master demanding queue. If the received dual way demanding message is a response message, the procedure proceeds to step S1104 for determining that the response message is a response of high priority demanding message or a response of low priority demanding message. When it is determined that the dual way demanding message is a response message responded to a low priority demanding message, the procedure proceeds to step S1105 for adding the dual way demanding message to the response queue of low priority demanding messages. Otherwise, when it is determined that the dual way demanding message is a response message responded to a high priority demanding message, the procedure proceeds to step S1106 for adding the dual way demanding message to the response queue of high priority demanding messages. After that, the procedure returns to step S1101 for continuing determining whether a dual way demanding message from the master device 210 is received. Specifically, when the received dual way demanding message is a response message, the procedure proceeds to step S1104 for comparing the ID of the response message with the ID of one or more demanding messages previously transmitted by the transmission demanding terminal(s) 240, in order to determine that the received dual way demanding message is a response message for responding to a high priority demanding message or a low priority demanding message. When no dual way demanding message from the master device 210 is received (if not in step S1101), the procedure proceeds to step S1110 for determining whether there is a dual way demanding message in the master response queue. If yes, the procedure proceeds to step S1111 for triggering a high priority notice signal. Then, step S1112 is executed to scan the existence of a message with the address of the master device 210. In step S1113, determining whether a message with the address of the master device 210 is received is made. If not, the procedure returns to step S1112 for continuing scanning the existence of a message with the address of the master device 210. In contrast, when a message with the address of the master device 210 is received (if yes in step S1113), the procedure proceeds to step S1114 for transmitting the dual way demanding message to the master device 210. Here, the dual way demanding message is a high priority response message corresponding to the high priority notice signal. After the dual way demanding message is transmitted to the master device 210, the procedure proceeds to step S1115 for stopping triggering the high priority notice signal. Then, in step S1116, the processed dual way demanding message is removed from the master response queue. In another embodiment, when there is a dual way demanding message in the master response queue (if yes in step S1110), the transmission demanding terminal 240 can trigger a low priority notice signal. The transmission demanding terminal 240 can define the dual way demanding message as the response to the master device 210 by triggering a high priority notice signal or a low priority notice signal according to actual requirements; and this can be defined in the transmission demanding terminal 240 in advance. Defining the dual way demanding message for responding to the master device 210 to be a high priority notice signal allows the dual way demanding message to first be received by the master device 210.

When no dual way demanding message from the master device 210 is received and there is no dual way demanding message in the master response queue (if not in step S1110), the procedure proceeds to step S1120 for determining whether there is a dual way demanding message in the high priority demanding queue. If yes, the procedure proceeds to step S1121 for triggering a high priority notice signal. Then, the procedure proceeds to step S1122 for scanning a message with the address of the master device 210. In step S1123, determining whether a message with the address of the master device 210 is received is made. If not, the procedure proceeds to step S1122 for continuing scanning a message with the address of the master device 210. When a message with the address of the master device 210 is received (if yes in step S1123), the procedure proceeds to step S1124 for transmitting the dual way demanding message to the master device 210. Here, the dual way demanding message is a high priority demanding message corresponding to the high priority notice signal. After the dual way demanding message is transmitted to the master device 210, the procedure proceeds to step S1125 for stopping triggering the high priority notice signal. Subsequently, in step S1126, the processed dual way demanding message is removed from the high priority demanding queue. After that, the procedure returns to step S1101. Then, when neither a dual way demanding message from the master device 210 is received, a dual way demanding message exists in the master response queue, nor a dual way demanding message exists in the high priority demanding queue (if not in step S1120), the procedure proceeds to step S1130 for determining whether a dual way demanding message exists in the low priority demanding queue. If yes, the procedure proceeds to step S1131 for triggering a low priority notice signal. Then, the procedure proceeds to step S1132 for scanning the existence of a message with the address of the master device 210. In step S1133, determining whether a message with the address of the master device 210 is received is made. If not, the procedure returns to step S1132 for continuing scanning the existence of a message with the address of the master device 210. When a message with the address of the master device 210 is received (if yes in step S1133), the procedure proceeds to step S1134 for transmitting the dual way demanding message to the master device 210. Here, the dual way demanding message is, for example, a low priority demanding message corresponding to the low priority notice signal. After the dual way demanding message is transmitted to the master device 210, the procedure proceeds to step S1135 for stopping triggering the low priority notice signal. Then, in step S1136, the processed dual way demanding message is removed from the low priority demanding queue. After that, the procedure returns to step S1101 for continuing determining whether a dual way demanding message from the master device 210 is received. Specifically, the master demanding queue, the response queue of low priority demanding messages, the response queue of high priority demanding messages, the master response queue, the high priority demanding queue, and the low priority demanding queue are stored in one or more storage units of the transmission demanding terminal 240 (not shown in the drawings).

In another embodiment, steps S1101, S1110, S1120 and S1130 can be performed in another order. For example, when no dual way demanding message from the master device 210 is received (if not in step S1101), the procedure first proceeds to step S1120 (determining whether a dual way demanding message exists in the high priority demanding queue), and when the high priority demanding queue is empty, the procedure then proceeds to step S1110 (determining whether a dual way demanding message exists in the master response queue). However, the order of steps in the present disclosure can be changed according to actual requirements, and the order of steps of determination can be predefined in the transmission demanding terminal 240.

Figure 12A:
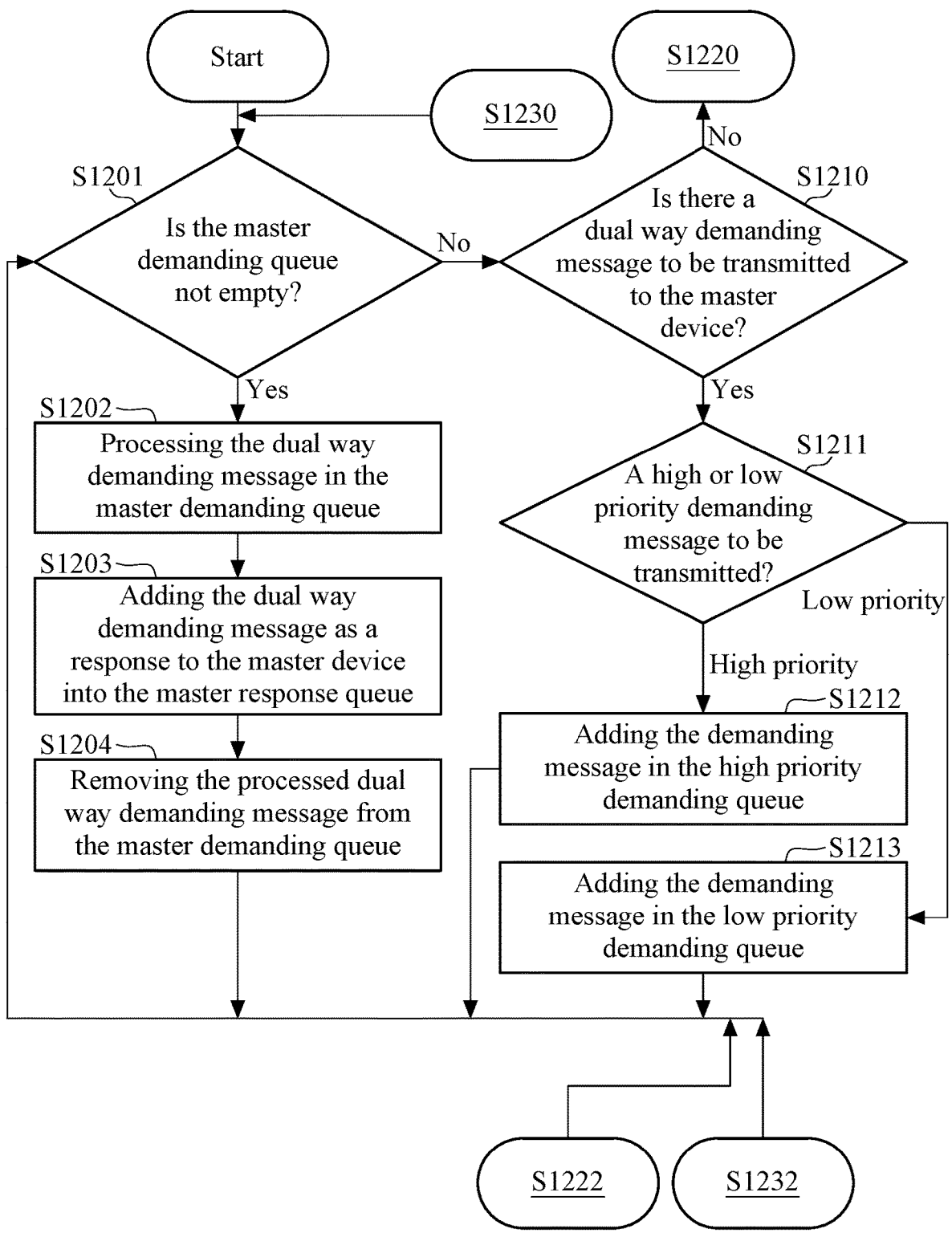
FIG. 12A and FIG. 12B are flow charts illustrating that a transmission demanding terminal processes a dual way demanding message according to an embodiment of the present disclosure.
Figure 12B:
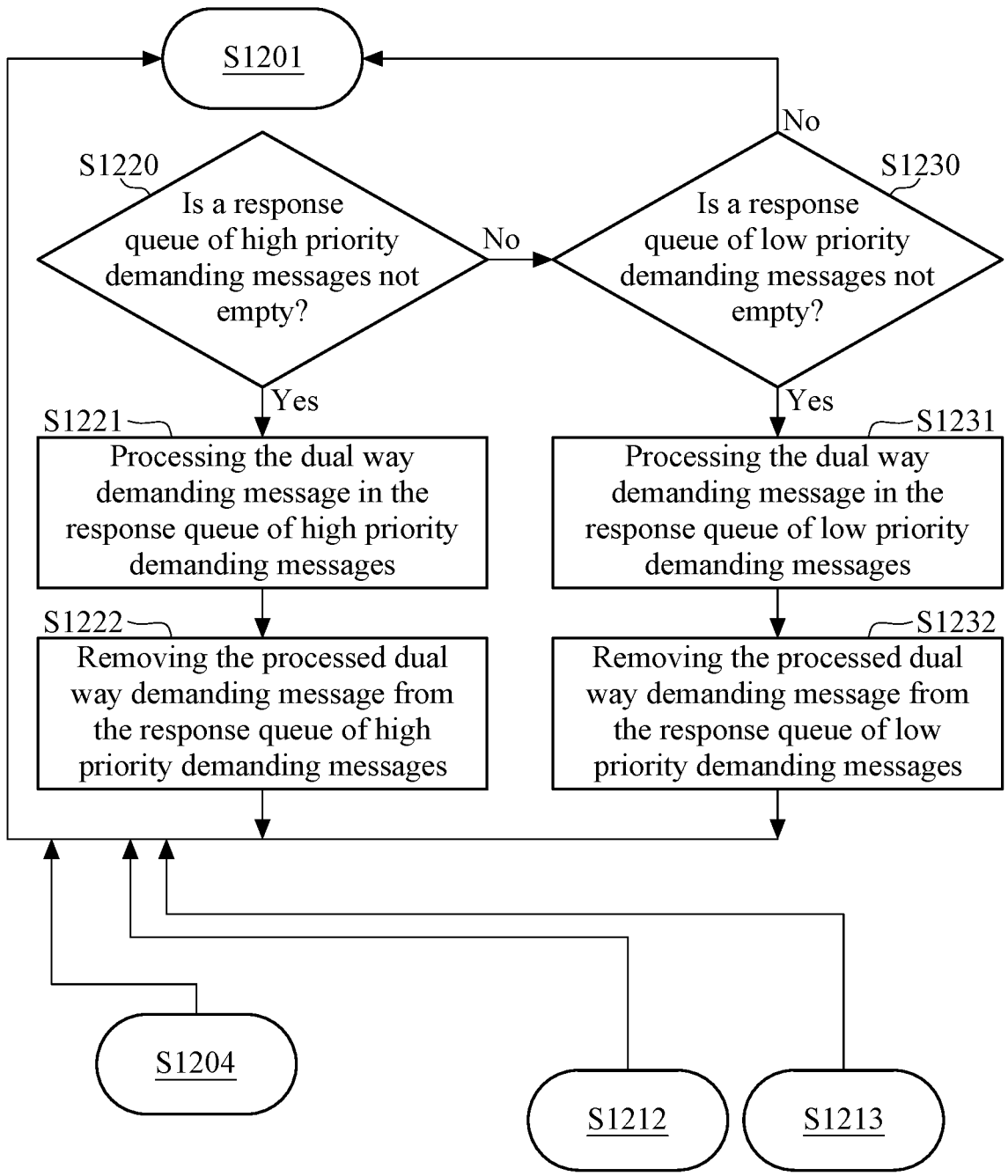

Please refer to FIG. 11A, FIG. 11B, FIG. 12A and FIG. 12B. FIG. 12A and FIG. 12B together provide a flow chart illustrating that a transmission demanding terminal processes a dual way demanding message according to an embodiment of the present disclosure. In step S1201, determining whether there is a dual way demanding message in the master demanding queue is made. If yes, the procedure proceeds to step S1202 for processing the dual way demanding message existing in the master demanding queue. For example, the transmission demanding terminal 240, according to the content of the received dual way demanding message, prepares the dual way demanding message to be a response to the master device 210; and optionally, the transmission demanding terminal 240 executes one or more relative instructions in the content of the received dual way demanding message and then defines the result of executing to be a dual way demanding message as a response to the master device 210. In step S1203, the dual way demanding message as a response to the master device 210 is added in the master response queue. Then, the procedure proceeds to step S1204 for removing the processed dual way demanding message from the master demanding queue. After that, the procedure returns to step S1201 for continuing determining whether there is a dual way demanding message in the master demanding queue. When there is not a dual way demanding message in the master demanding queue (if not in step S1201), the procedure proceeds to step S1210 for determining whether there is a dual way demanding message to be transmitted to the master device 210. Specifically, this dual way demanding message is, for example, a demanding message that the transmission demanding terminal 240 needs to transmit to the master device 210. Subsequently, in step S1211, determining whether the dual way demanding message to be transmitted to the master device 210 is a high priority demanding message or a low priority demanding message, is made. If the dual way demanding message is a high priority demanding message, the procedure proceeds to step S1212 for adding the dual way demanding message to be transmitted to the master device 210 into the high priority demanding queue. If the dual way demanding message is a low priority demanding message, the procedure proceeds to step S1213 for adding the dual way demanding message to be transmitted to the master device 210 into the low priority demanding queue. After that, the procedure returns to step S1201. Furthermore, in step S1211, the transmission demanding terminal 240 can, according to the content of the transmitted message, the type of a triggering event and/or the type of a status message, determine that the dual way demanding message is a high priority demanding message or a low priority demanding message.

When there is no dual way demanding message in the master demanding queue and there is no dual way demanding message to be transmitted to the master device 210 (if not in step S1210), the procedure proceeds to step S1220 for determining whether a dual way demanding message in the response queue of high priority demanding messages. If yes, the procedure proceeds to step S1221 for processing the dual way demanding message existing in the response queue of high priority demanding messages. For example, the transmission demanding terminal 240, according to the ID(s) of the previously-transmitted high priority demanding message(s) and the ID of the dual way demanding message of the response queue of high priority demanding messages, compares the previously-transmitted high priority demanding message(s) with the dual way demanding message of the response queue of high priority demanding messages. When it is found that one of the previously-transmitted high priority demanding message(s) has the same ID as the dual way demanding message of the response queue of high priority demanding messages, a correlation between the demanding message and the response message is established, and this correlation indicates that the high priority request has obtained a response from the master device 210. Also, the dual way demanding message and the correlation between the demanding message and the response message are correspondingly recorded or stored in a storage unit. Next, the procedure proceeds to step S1222 for removing from the response queue of high priority demanding messages the processed dual way demanding message. After that, the procedure returns to step S1201.

When neither a dual way demanding message exists in the master demanding queue, a dual way demanding message needs to be transmitted to the master device 210, nor a dual way demanding message exists in the response queue of high priority demanding messages (if not in step S1220), the procedure proceeds to step S1230 for determining whether a dual way demanding message exists in the response queue of low priority demanding messages. If yes, the procedure proceeds to step S1231 for processing the dual way demanding message existing in the response queue of low priority demanding messages. For example, the transmission demanding terminal 240 compares one or more previously-transmitted low priority demanding messages with the dual way demanding message in the response queue of low priority demanding messages according to their ID, and when it is found that one previously-transmitted low priority demanding message has the same ID as the dual way demanding message, a correlation between the demanding message and the response message is established and indicates that the low priority request has obtained a response from the master device 210, and the dual way demanding message and the correlation are correspondingly recorded or stored in a storage unit. Then, the procedure proceeds to step S1232 for removing from the response queue of low priority demanding messages the dual way demanding message that has been processed. After that, the procedure returns to step S1201 for continuing determining whether a dual way demanding message exists in the master demanding queue.

In another embodiment, steps S1201, S1210, S1220 and step S1230 can be performed in another order. For example, the transmission demanding terminal 240 can perform step S1210 for determining whether there is a dual way demanding message to be transmitted to the master device 210, and if not, the transmission demanding terminal 240 then performs step S1210 for determining whether a dual way demanding message exists in master demanding queue. Optionally, the transmission demanding terminal 240 can perform step S1220 for determining whether a dual way demanding message exists in the response queue of high priority demanding messages. By doing so, the transmission demanding terminal 240 can first process or confirm an error status message or a time-sensitive message, and then performs step S1210 for determining whether a dual way demanding message exists in the master demanding queue. Therefore, the present disclosure does not intend to limit the order of these steps of determination, and allows the order to be changed according to actual requirements so that the present disclosure may satisfy the requirements of the entire system or a respective transmission demanding terminal 240. Specifically, the master demanding queue stored in the transmission demanding terminal 240 stores the demanding message from the master device 210, and the response queue of low priority demanding messages and the response queue of high priority demanding messages are used to store responses of the master device 210 to the transmission demanding terminal 240, the master response queue stores responses of the transmission demanding terminals 240 to the master device 210, and the high priority demanding queue and the low priority demanding queue are used to store requests of the transmission demanding terminals 240 for data in the master device 210.

To sum up, employing one or more transmission channels 260 to control the multiplexer 250 to enable one or more transmission demanding terminals 240 to be connected may break through the limitation of the number of nodes connected in a multipoint transmission structure and carry out bidirectional communication. Also, using a notice signal and an expander together allows one or more node terminals (transmission demanding terminals 240) to actively communicate with the master device 210. Therefore, the entire system allows more nodes to be connected and also enables the bidirectional communication between the master device 210 and the nodes. On the other hand, the use of high priority notice signals and low priority notice signals allows one more important messages of the two parties to first be transmitted, and also allows that the master device 210 or one or more transmission demanding terminals 240 first cope with one or more error situations or one or more time-sensitive messages. It may become freer to design the number of nodes that the master device can connect to, according to various requirements of the system for bidirectional communication.

What is claimed is:

1. A dual way communication method adapted for a multipoint transmission structure and applied to a controller, the dual way communication method comprising:
   detecting whether a transmission demanding terminal triggers a notice signal;
   enabling, via a transmission channel, a dual way communication channel for connecting to the transmission demanding terminal which triggers the notice signal when the notice signal is detected; and
   receiving or transmitting a dual way demanding message corresponding to the transmission demanding terminal through the dual way communication channel,
   wherein detecting whether the transmission demanding terminal triggers the notice signal, comprises:
      reading a status signal via an expander; and
      recognizing, according to the status signal, the notice signal triggered by the transmission demanding terminal.

2. The dual way communication method according to claim 1, wherein enabling, via the transmission channel, the dual way communication channel for connecting to the transmission demanding terminal corresponding to the notice signal comprises:
   controlling a multiplexer via the transmission channel to enable the dual way communication channel for connecting to the transmission demanding terminal corresponding to the notice signal.

3. The dual way communication method according to claim 1, wherein detecting whether the transmission demanding terminal triggers the notice signal, comprises:
   triggering the notice signal when the transmission demanding terminal detects the dual way demanding message.

4. The dual way communication method according to claim 3, further comprising:
   triggering a high priority notice signal or a low priority notice signal according to priority of the dual way demanding message via the transmission demanding terminal,
   wherein the dual way demanding message corresponding to the high priority notice signal is first transmitted or received.

5. The dual way communication method according to claim 1, further comprising:
   enabling the dual way communication channel via the transmission channel to conduct the transmission demanding terminal corresponding to the dual way demanding message when the dual way demanding message is detected; and
   transmitting or receiving the dual way demanding message through the dual way communication channel.

6. The dual way communication method according to claim 5, further comprising:
   first enabling the dual way communication channel via the transmission channel to connect to the transmission demanding terminal corresponding to a high priority dual way demanding message when the high priority dual way demanding message is detected; and
   transmitting or receiving the high priority dual way demanding message through the dual way communication channel.

7. The dual way communication method according to claim 1, wherein transmitting or receiving the dual way demanding message corresponding to the transmission demanding terminal through the dual way communication channel comprises:
   transmitting or receiving the dual way demanding message by the transmission demanding terminal using a baseboard management controller and the dual way communication channel;
   wherein the dual way demanding message is a demanding message, a response message, a high priority demanding message, a low priority demanding message, a high priority response message or a low priority response message which conforms to an IPMB protocol.

8. The dual way communication method according to claim 1, wherein reading the status signal via the expander comprises:
   controlling a multiplexer through the transmission channel to enable an expanded channel corresponding to the expander; and
   reading the status signal through the expanded channel.

9. The dual way communication method according to claim 1, further comprising:
   stopping triggering the notice signal by the transmission demanding terminal when transmission of the dual way demanding message is finished; and
   disabling the dual way communication channel corresponding to the notice signal via the transmission channel.

10. The dual way communication method according to claim 9, further comprising:
    controlling a multiplexer through the transmission channel to disable the dual way communication channel and enable an expanded channel corresponding to an expander when the notice signal is not detected.

11. A dual way communication system, comprising:
a master device, comprising:
a controller; and
a transmission port, coupled to the controller;
a transmission channel, connected to the transmission port of the master device; and
a plurality of dual way communication channels for respectively connected to a plurality of transmission demanding terminals;
wherein the transmission channel is able to be selectively connected to one dual way communication channel of the plurality of dual way communication channels, and the controller, via the transmission port, detects whether one transmission demanding terminal of the plurality of transmission demanding terminals triggers a notice signal;
when the controller detects the notice signal, the controller, via the transmission channel, enables one dual way communication channel of the plurality of dual way communication channels for connecting to the transmission demanding terminal which triggers the notice signal, among the plurality of transmission demanding terminals; and
the controller receives a dual way demanding message from the transmission demanding terminal which triggers the notice signal through the enabled dual way communication channel, or transmits the dual way demanding message to the transmission demanding terminal which triggers the notice signal through the enabled dual way communication channel,
wherein the controller is connected to an expander through the transmission channel, the controller reads a status signal through the expander, and the controller recognizes the notice signal triggered by one of the plurality of transmission demanding terminals according to the status signal.

12. The dual way communication system according to claim 11, wherein the transmission channel is connected to a multiplexer; and
the controller controls the multiplexer through the transmission channel to enable one dual way communication channel of the plurality of dual way communication channels, so as to connect to the transmission demanding terminal corresponding to the notice signal.

13. The dual way communication system according to claim 11, wherein one transmission demanding terminal of the plurality of transmission demanding terminals is connected to the transmission port through a high priority notice channel and a low priority notice channel, and is able to trigger a high priority notice signal and transmit, through the high priority notice channel, the high priority notice signal to the controller or to trigger a low priority notice signal and transmit the low priority notice signal to the controller through the low priority notice channel according to a priority of the dual way demanding message.

14. The dual way communication system according to claim 11, wherein the controller is a baseboard management controller, and the dual way demanding message is a demanding message, a response message, a high priority demanding message, a low priority demanding message, a high priority response message or a low priority response message which conforms to an IPMB protocol.

15. The dual way communication system according to claim 11, wherein the transmission channel is connected to a multiplexer, and the expander is connected to the multiplexer,
the controller controls the multiplexer via the transmission channel to enable an expanded channel corresponding to the expander, and the controller reads the status signal through the expanded channel.

16. The dual way communication system according to claim 11, wherein the transmission channel is connected to a multiplexer, and the multiplexer is connected to an expander,
wherein the notice signal is not detected by the controller, the controller controls the multiplexer via the transmission channel to disable the enabled dual way communication channel and enable an expanded channel corresponding to the expander.

17. A dual way communication master device, applied to a multipoint transmission structure, the master device comprising:
a controller;
a transmission port, coupled to the controller; and
a transmission channel, connected to the transmission port;
wherein when the controller detects a notice signal via the transmission port, the controller enables a dual way communication channel corresponding to the notice signal through the transmission channel, and the controller transmits a dual way demanding message to a transmission demanding terminal which triggers the notice signal or receives the dual way demanding message from the transmission demanding terminal which triggers the notice signal through the enabled dual way communication channel,
wherein the controller is connected to an expander through the transmission channel, the controller reads a status signal through the expander, and the controller recognizes the notice signal triggered by the transmission demanding terminal according to the status signal.

18. The dual way communication master device according to claim 17, wherein when the controller detects that the dual way demanding message exists in the master device, the controller enables the dual way communication channel corresponding to the dual way demanding message through the transmission channel and the controller transmits or receives the dual way demanding message through the dual way communication channel.

19. The dual way communication master device according to claim 18, wherein when the controller detects that a high priority dual way demanding message exists in the master device, the controller first enables the dual way communication channel corresponding to the high priority dual way demanding message through the transmission channel, and the controller transmits or receives the high priority dual way demanding message through the dual way communication channel.

20. The dual way communication master device according to claim 17, wherein when the controller detects a high priority notice signal via the transmission port, the controller first enables the dual way communication channel corresponding to the high priority notice signal through the transmission channel, and the controller transmits the dual way demanding message corresponding to the high priority notice signal through the dual way communication channel or receives the dual way demanding message corresponding to the high priority notice signal through the dual way communication channel.

21. The dual way communication master device according to claim 17, wherein the controller is a baseboard management controller, and the dual way demanding message is a demanding message, a response message, a high priority demanding message, a low priority demanding message, a high priority response message or a low priority response message which conforms to an IPMB protocol.

* * * * *